(12) United States Patent
Gardner

(10) Patent No.: US 7,722,147 B2
(45) Date of Patent: May 25, 2010

(54) PRINTING SYSTEM ARCHITECTURE

(75) Inventor: Deane A. Gardner, Cupertino, CA (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 861 days.

(21) Appl. No.: 10/966,205

(22) Filed: Oct. 15, 2004

(65) Prior Publication Data

US 2006/0082814 A1 Apr. 20, 2006

(51) Int. Cl.
*B41J 2/205* (2006.01)
(52) U.S. Cl. .................................. 347/15; 347/5; 347/9
(58) Field of Classification Search .................... 347/5, 347/9, 14–15, 12, 41, 42
See application file for complete search history.

(56) References Cited

U.S. PATENT DOCUMENTS

| | | | |
|---|---|---|---|
| 4,486,739 A | 12/1984 | Franaszek et al. |
| 4,563,689 A | 1/1986 | Murakami et al. |
| 5,138,333 A | 8/1992 | Bartky et al. |
| 5,359,350 A | 10/1994 | Nakano et al. |
| 5,361,084 A | 11/1994 | Paton et al. |
| 5,361,420 A | 11/1994 | Dobbs et al. |
| 5,369,420 A | 11/1994 | Bartky |
| 5,408,590 A | 4/1995 | Dvorzsak |
| 5,438,350 A | 8/1995 | Kerry |
| 5,463,414 A | 10/1995 | Temple et al. |
| 5,463,416 A | 10/1995 | Paton et al. |
| 5,512,796 A | 4/1996 | Paton |
| 5,512,922 A | 4/1996 | Paton |
| 5,521,619 A | 5/1996 | Suzuki et al. |
| 5,604,711 A | 2/1997 | Cheung |
| 5,604,771 A | 2/1997 | Quiros |
| 5,631,675 A | 5/1997 | Futagawa |
| 5,663,217 A | 9/1997 | Kruse |
| 5,668,579 A | 9/1997 | Fujii et al. |
| 5,731,048 A | 3/1998 | Ashe et al. |
| 5,779,837 A | 7/1998 | Harvey |
| 5,790,139 A | 8/1998 | Umeno et al. |
| 5,825,375 A | 10/1998 | Droit et al. |
| 5,837,046 A | 11/1998 | Schofield et al. |

(Continued)

FOREIGN PATENT DOCUMENTS

CN 101040505 9/2007

(Continued)

OTHER PUBLICATIONS

International Search Report issued in PCT/US2004/026964, Mar. 3, 2005, 3 pgs.

(Continued)

*Primary Examiner*—Lam S Nguyen
(74) *Attorney, Agent, or Firm*—Fish & Richardson P.C.

(57) ABSTRACT

Systems and techniques for printing on a workpiece. In one implementation, a print system has a collection of print elements arranged to span a print area, a workpiece conveyor to move a workpiece through the print area, and a detector to detect a position of the workpiece in the print area. The print system also has control electronics to instruct the collection of print elements to print an image on the workpiece substantially immediately when the collection of print elements receive the instruction through an optical communication path.

16 Claims, 11 Drawing Sheets

U.S. PATENT DOCUMENTS

| | | | |
|---|---|---|---|
| 5,842,258 | A | 12/1998 | Harvey et al. |
| 5,843,219 | A | 12/1998 | Griffin et al. |
| 5,855,713 | A | 1/1999 | Harvey |
| 5,903,754 | A | 5/1999 | Pearson |
| 5,910,372 | A | 6/1999 | Griffin et al. |
| 5,959,643 | A | 9/1999 | Temple et al. |
| 5,975,672 | A | 11/1999 | Wen |
| 5,984,448 | A | 11/1999 | Yanagawa |
| 5,984,464 | A | 11/1999 | Steinfield et al. |
| 5,997,124 | A | 12/1999 | Capps et al. |
| 6,010,202 | A | 1/2000 | Arnott |
| 6,014,153 | A | 1/2000 | Harvey |
| 6,033,055 | A | 3/2000 | Nagoshi et al. |
| RE36,667 | E | 4/2000 | Michaelis et al. |
| 6,046,822 | A | 4/2000 | Wen et al. |
| 6,088,050 | A | 7/2000 | Ng |
| 6,089,698 | A | 7/2000 | Temple et al. |
| 6,092,886 | A | 7/2000 | Hosono |
| 6,102,513 | A | 8/2000 | Wen |
| 6,106,092 | A | 8/2000 | Norigoe et al. |
| 6,123,405 | A | 9/2000 | Temple et al. |
| 6,193,343 | B1 | 2/2001 | Norigoe et al. |
| 6,217,141 | B1 | 4/2001 | Nakamura et al. |
| 6,228,311 | B1 | 5/2001 | Temple et al. |
| 6,232,135 | B1 | 5/2001 | Ashe et al. |
| 6,257,689 | B1 | 7/2001 | Yonekubo |
| 6,260,951 | B1 | 7/2001 | Harvey et al. |
| 6,270,179 | B1 | 8/2001 | Nou |
| 6,276,772 | B1 | 8/2001 | Sakata et al. |
| 6,281,913 | B1 | 8/2001 | Webb |
| 6,286,943 | B1 | 9/2001 | Ashe et al. |
| 6,295,077 | B1 | 9/2001 | Suzuki |
| 6,312,076 | B1 | 11/2001 | Taki et al. |
| 6,328,395 | B1 | 12/2001 | Kitahara et al. |
| 6,331,040 | B1 * | 12/2001 | Yonekubo et al. ............. 347/15 |
| 6,331,045 | B1 | 12/2001 | Harvey et al. |
| 6,352,328 | B1 | 3/2002 | Wen et al. |
| 6,379,440 | B1 | 4/2002 | Tatum et al. |
| 6,399,402 | B2 | 6/2002 | Ashe et al. |
| 6,402,278 | B1 | 6/2002 | Temple |
| 6,402,282 | B1 | 6/2002 | Webb |
| 6,412,924 | B1 | 7/2002 | Ashe et al. |
| 6,422,690 | B1 | 7/2002 | Harvey et al. |
| 6,437,879 | B1 | 8/2002 | Temple |
| 6,460,991 | B1 | 10/2002 | Temple et al. |
| 6,467,863 | B1 | 10/2002 | Imanaka et al. |
| 6,468,779 | B1 | 10/2002 | Red'kina |
| 6,476,096 | B1 | 11/2002 | Molloy et al. |
| 6,505,918 | B1 | 1/2003 | Condie et al. |
| 6,517,195 | B1 | 2/2003 | Koeda |
| 6,565,191 | B1 | 5/2003 | Bolash et al. |
| 6,568,779 | B1 | 5/2003 | Pulman et al. |
| 6,572,221 | B1 | 6/2003 | Harvey et al. |
| 6,652,068 | B2 | 11/2003 | Hsu et al. |
| 6,685,297 | B2 | 2/2004 | Butterfield et al. |
| 6,752,482 | B2 | 6/2004 | Fukano et al. |
| 6,764,154 | B2 | 7/2004 | Nishikori et al. |
| 7,076,724 | B2 | 7/2006 | Cole et al. |
| 7,234,788 | B2 | 6/2007 | Gardner |
| 7,234,799 | B2 | 6/2007 | Kwan et al. |
| 7,436,540 | B2 | 10/2008 | Okamoto et al. |
| 2002/0033644 | A1 | 3/2002 | Takamura |
| 2002/0186393 | A1 | 12/2002 | Pochuer et al. |
| 2003/0081227 | A1 | 5/2003 | Williams et al. |
| 2003/0160836 | A1 | 8/2003 | Fukano et al. |
| 2004/0000560 | A1 | 1/2004 | Henry et al. |
| 2004/0070791 | A1 | 4/2004 | Pattusamy et al. |
| 2004/0113959 | A1 | 6/2004 | Tamura |
| 2005/0018940 | A1 | 1/2005 | Obayashi |
| 2005/0270329 | A1 | 12/2005 | Hoisington et al. |
| 2006/0066701 | A1 | 3/2006 | Hirakawa |
| 2006/0082797 | A1 | 4/2006 | Gardner |
| 2006/0082811 | A1 | 4/2006 | Gardner et al. |
| 2006/0082813 | A1 | 4/2006 | Martin et al. |
| 2006/0087523 | A1 | 4/2006 | Horsnell et al. |
| 2006/0092201 | A1 | 5/2006 | Gardner |

FOREIGN PATENT DOCUMENTS

| | | |
|---|---|---|
| CN | 101052942 | 10/2007 |
| CN | 101052943 | 10/2007 |
| CN | 101052974 | 10/2007 |
| CN | 101091153 | 12/2007 |
| CN | 101189622 | 5/2008 |
| EP | 0 375 147 | 6/1990 |
| EP | 0 600 707 | 6/1994 |
| EP | 0 810 097 | 12/1997 |
| EP | 0 876 915 | 11/1998 |
| EP | 0 919 382 | 6/1999 |
| EP | 0 964 339 | 12/1999 |
| EP | 1 212 201 | 6/2002 |
| EP | 1 267 254 | 12/2002 |
| EP | 1 293 341 | 3/2003 |
| EP | 1 452 313 | 9/2004 |
| EP | 0 827 838 | 3/2005 |
| EP | 1 805 593 | 7/2007 |
| EP | 1 810 127 | 7/2007 |
| EP | 1 810 223 | 7/2007 |
| EP | 1 810 482 | 7/2007 |
| EP | 1 820 087 | 8/2007 |
| EP | 1 820 088 | 8/2007 |
| JP | 58055253 | 4/1983 |
| JP | 03065069 | 3/1991 |
| JP | 2001010035 | 1/2001 |
| JP | 2008-516801 | 5/2008 |
| JP | 2008-516802 | 5/2008 |
| JP | 2008-516803 | 5/2008 |
| JP | 2008-517379 | 5/2008 |
| JP | 2008-517380 | 5/2008 |
| JP | 2008-517811 | 5/2008 |
| KR | 2007-0062532 | 6/2007 |
| KR | 2007-0062549 | 6/2007 |
| KR | 2007-0065348 | 6/2007 |
| KR | 2007-0065383 | 6/2007 |
| KR | 2007-0065384 | 6/2007 |
| KR | 2007-0095277 | 9/2007 |
| WO | WO 01/12444 | 2/2001 |
| WO | WO 01/13328 | 2/2001 |
| WO | WO 04/00560 | 12/2003 |
| WO | WO 2005/018940 | 3/2005 |
| WO | WO 2006/044530 | 4/2006 |
| WO | WO 2006/044587 | 4/2006 |
| WO | WO 2006/044597 | 4/2006 |
| WO | WO 2006/044598 | 4/2006 |
| WO | WO 2006/044599 | 4/2006 |
| WO | WO 2006/049836 | 5/2006 |
| WO | WO 2006/052466 | 5/2006 |
| WO | WO 2006/052885 | 5/2006 |

OTHER PUBLICATIONS

Notification Concerning Transmittal of International Preliminary Report on Patentability issued in PCT/US2004/026964, Mar. 2, 2006, 8 pgs.

Notification of Transmittal of the International Search Report and the Written Opinion of the International Searching Authority issued in PCT/US2005/040288, Mar. 17, 2006, 21 pgs.

Notification of Transmittal of the International Search Report and the Written Opinion of the International Searching Authority issued in PCT/US2005/038743, Apr. 6, 2006, 14 pgs.

Notification of Transmittal of the International Search Report and the Written Opinion of the International Searching Authority issued in PCT/US2005/036935, May 31, 2006, 13 pgs.

Chinese Office Action dated Nov. 16, 2007 issued in 200480023818X, and translation, 16 pgs.

Chinese Office Action dated Jan. 15, 2009 issued in 200480023818X, and translation, 8 pgs.
European Office Action dated Jul. 15, 2008 issued in 05 807 451.9—1245, .5 pgs.
Chinese Office Action dated Aug. 22, 2008 issued in 200580043211.2, and translation, 12 pgs.
European Office Action dated Jul. 21, 2008 issued in 05 813 253.1—2304, 3 pgs.
Chinese Office Action dated Feb. 9, 2009 issued in 200580045849.X, 6 pgs.
8B/10B-encoding scheme. (8 pages) [Online], [retrieved on Sep. 3, 2008]. Retrieved from the Internet: <URL:http://en.wikipedia.org/wiki/8B/10B_encoding>.
Fibre Channel Protocol. (7 pages). [Online], [retrieved on Sep. 7, 2008]. Retrieved from the Internet: <URL:http://en.wikipedia.org/wiki/Fibre_Channel_Protocol>.
IEEE 802.3 Standard. (4 pages)[Online], [retrieved on Sep. 6, 2008]. Retrieved from the Internet: <URL:http://en.wikipedia.org/wiki/IEEE802.3>.
Sachs, "Fibre Channel and Related Standards", IEEE Communications Magazine, IEEE Service Center, vol. 34, Aug. 1996, pp. 40-50.
Office Action issued in U.S. Appl. No. 10/642,951 dated Apr. 14, 2005.
Office Action issued in U.S. Appl. No. 10/642,951 dated Sep. 23, 2005.
Office Action issued in U.S. Appl. No. 10/642,951 dated Jan. 26, 2006.
Office Action issued in U.S. Appl. No. 10/642,951 dated Jul. 19, 2006.
Office Action issued in U.S. Appl. No. 10/642,951 dated Jun. 7, 2007.
Office Action issued in U.S. Appl. No. 10/642,951 dated Aug. 29, 2007.
Office Action issued in U.S. Appl. No. 10/642,951 dated Apr. 18, 2008.
Office Action issued in U.S. Appl. No. 10/642,951 dated Sep. 30, 2008.
Office Action issued in U.S. Appl. No. 10/966,023 dated Jul. 23, 2008.
Office Action issued in U.S. Appl. No. 10/981,072 dated Sep. 27, 2006.
Office Action issued in U.S. Appl. No. 10/981,888 dated Oct. 23, 2006.
Office Action issued in U.S. Appl. No. 10/981,888 dated May 16, 2007.
Office Action issued in U.S. Appl. No. 10/981,888 dated Nov. 28, 2007.
Office Action issued in U.S. Appl. No. 10/981,888 dated Jul. 22, 2008.
Office Action dated Jul. 23, 2008 issued in U.S. Appl. No. 10/966,022.
Office Action dated Feb. 3, 2009 issued in U.S. Appl. No. 10/966,022.
Office Action dated Aug. 4, 2008 issued in U.S. Appl. No. 10/966,024.
Office Action dated Jan. 27, 2009 issued in U.S. Appl. No. 10/966,024.
Office Action dated Jun. 11, 2008 issued in U.S. Appl. No. 10/966,019.
Office Action dated Jun. 26, 2008 issued in U.S. Appl. No. 10/977,298.
Office Action dated Mar. 31, 2009 issued in Chinese Application No. 200580035216.
Office Action dated Feb. 9, 2009 issued in Chinese Application No. 200580045849.X.
Office Action dated Jan. 16, 2009 issued in Chinese Application No. 200580035204.8.
Office Action dated Jul. 18, 2008 issued in Chinese Application No. 200580035204.8.
Office Action dated Jun. 6, 2008 issued in Chinese Application No. 200580037513.9.
Office Action dated Mar. 24, 2009 issued in European Application No. 05 807 759.5.
Office Action dated Jul. 21, 2008 issued in European Application No. 05 813 253.1.
International Search Report and Written Opinion issued in PCT/US2005/040288, Mar. 17, 2006.
International Search Report and Written Opinion issued in PCT/US2005/038743, Apr. 6, 2006.
International Search Report and Written Opinion issued in PCT/US2005/036920, dated Feb. 20, 2006.
International Preliminary Report on Patentability issued in PCT/US2005/036920, dated Apr. 26, 2007.
International Search Report and Written Opinion issued in PCT/US2005/036934, dated Dec. 6, 2006.
International Search Report and Written Opinion issued in PCT/US2005/036807, dated Nov. 30, 2006.
International Preliminary Report on Patentability issued in PCT/US2005/036807, dated May 10, 2007.
International Search Report and Written Opinion issued in PCT/US2005/036808, dated Feb. 21, 2006.
International Preliminary Report on Patentability issued in PCT/US2005/036808, dated Apr. 26, 2007.
U.S. Appl. No. 10/642,951, filed Aug. 18, 2003 "Individual Jet Voltage Trimming Circuity".
U.S. Patent Application entitled "Individual Voltage Trimming With Waveforms" filed Nov. 3, 2004.
David A. Johns et al., "Analog Integrated Circuit Design", John Wiley & Sons, Inc., 1997. pp. 39-42, 396-397 and 398-400.
U.S. Appl. No. 10/966,022, filed Oct. 15, 2004, Gardner.
U.S. Appl. No. 10/966,023, filed Oct. 15, 2004, Gardner et al.
U.S. Appl. No. 10/966,024, filed Oct. 15, 2004, Martin et al.
U.S. Appl. No. 10/966,019, filed Oct. 15, 2004, Gardner et al.
U.S. Appl. No. 10/977,298, filed Oct. 29, 2004, Martin et al.
International Preliminary Report on Patentability issued on Apr. 26, 2007 in PCT/US2005/036934.
International Preliminary Report on Patentability issued on Jan. 10, 2008 in PCT/US2005/036936.
International Preliminary Report on Patentability issued on Apr. 26, 2007 in PCT/US2005/036935.
Chinese Office Action dated Aug. 14, 2009 issued in 200580035204.8.
Chinese Office action dated Mar. 13, 2009 issued in 200580035215.6.
Chinese Office Action dated May 25, 2003 issued in 2005800375139.
European Office Action issued on Mar. 24, 2009 in EP 05807759.5.
European Office Action issued on Aug. 10, 2009 in EP 05810801.0.
Office Action issued in U.S. Appl. No. 10/966,024 dated Aug. 7, 2009.
Office Action dated May 1, 2009 issued in U.S. Appl. No. 10/966,019.
Office Action dated Jun. 26, 2009 issued in U.S. Appl. No. 10/977,298.
Fibre Channel—Physical and Signaling Interface (FC-PH), American National Standards Institute, ANSI X3.230-1994.
Chinese Office Action dated Sep. 25, 2009 issued in 2005800432127, 7 pages.
Authorized Officer Nora Lindner, International Preliminary Report on Patentability for Application No. PCT/US2005/038743, dated May 18, 2007.
Authorized Officer Athlna Nickitas-Etienne, International Preliminary Report on Patentability for Application No. PCT/US2005/040288, dated May 18, 2007.
Chinese Office Action dated Aug. 14, 2009 issued in CN200580035204.8, with English Translation.
Chinese Office action dated Mar. 13, 2009 issued in CN200580035215.6, with English Translation.
Chinese Office Action dated Sep. 25, 2009 issued in CN2005800432127, with English Translation.
Notification of Transmittal of the International Search Report and the Written Opinion of the International Searching Authority, or the Declaration, International Application Serial No. PCT/US2005/036936, dated Jul. 12, 2007, 32 pages.

* cited by examiner

|  | Optical-Fiber PCI-X Version | Copper-Cable PCI Version |
|---|---|---|
| PC Bus Type | 64-Bit 66MHZ PCI-X | 32-bit 33MHz PCI |
| External Interface to Print head | 1.25Gbps 62.5um LC-style duplex optical fibre carries outgoing image packets and bidirectional tending packets | 50-conductor 0.5mm Flat Flexible Cable (FFC) with 8 pairs of pixel Data, 1 pair data Clock, 1 pair Fire trigger, 1 pair Tending, and pass-through lines for carriage-mounted Encoder and Paper Edge Sensor |
| Hardware Control Inputs | Encoder, Trigger, Enable from Copper Inputs PCB | Encoder, Trigger, Enable from Copper Inputs PCB |
| Image Bandwidth Capability | About 1Gb/s | About 200Mbit/s |
| Number of nozzle rows in Print head | 1-8 | 1-8 |
| Maximum number of nozzles per column | 5120 | 304 |
| Print Modes | Forward, Reverse, Continuous, or Triggered | Forward, Reverse, Continuous, or Triggered |
| Nozzle (Jet) Frequency at maximum number of nozzles | 24kHz | 78kHz |

FIG. 14

PRINTING SYSTEM ARCHITECTURE

CROSS-REFERENCE TO CO-PENDING APPLICATIONS

The application is a co-pending application with U.S. patent application Ser. No. 10/966,023 filed Oct. 15, 2004.

BACKGROUND

This disclosure relates to printing systems.

When an image such as a picture or a page of text is to be printed, image data generally is translated by a computer system from one format into another format understandable by a printer and then relayed to a print buffer associated with the printer. The print buffer receives the translated image data and stores at least a portion of the image data for subsequent printing by the printer.

Many printers include multiple discrete print elements (e.g., an inkjet nozzle in an inkjet print module). The print elements can be deployed to print selected components of the image. For example, selected print elements can be deployed to print at selected locations on a workpiece. As another example, in color printing, selected print elements can be deployed to print selected colors. Control electronics can coordinate the printing of images by deploying the print elements to print image data from the print buffer.

The print elements in a printer can be arranged in groups called print modules. The print elements in a module can be grouped according to the deployment of the constituent elements. For example, print elements that print at a selected array of positions can be grouped in a print module. As another example, print elements that print the same color (at a selected array of positions) can be grouped into a print module.

SUMMARY

The following disclosure relates to systems and techniques for printing. In one implementation, described is a method for synchronously printing an image on a workpiece. The method involves receiving image data at a location that is remote from a print head, arranging the received image data according to physical parameters of the print head to be used to print the image data on the workpiece, and sensing the speed of the workpiece on a workpiece conveyor relative to the print head. The method also involves detecting the position of the workpiece on a workpiece conveyor, forming a packet of image data, and sending the packet of image data to the print head. The method includes using the receipt of the packet of image data as a trigger to cause the image data at the print head to be printed substantially immediately on the workpiece.

One aspect of the image data being printed substantially immediately on the workpiece may involve printing image data substantially at an instant at which the image data arrives at the print head. In another aspect of the image data being printed substantially immediately on the workpiece, the image data can be received at the print head and latched, and the latched image data can be printed on the workpiece when a subsequent image data packet arrives at the print head. The subsequent image data packet arriving at the print head can cause the latched image data to be printed on the workpiece. The subsequent image data packet arriving at the print head can be a next subsequent image data packet. Alternatively, a receipt of a subsequent image data packet other than the next subsequent image data packet can cause the latched data to be printed on the workpiece.

In another aspect of the method, the arranging, sensing, detecting, and forming may be order-independent, and two or more of the receiving, arranging, sensing, detecting, forming, sending, and using may be performed at least partially in parallel. The method may involve translating the image data into a format that is understandable by a printer. The packet of image data may be formed by a data pump. The packet of image data can be sent to the print head at a data rate sufficient to minimize gaps and white spaces when printing. Image data for the data pump can be received from a Peripheral Component Interconnect-type bus of a host computer. In one aspect, a number of print elements on the print head can be associated according to a physical column of associated print nozzles. The physical column of associated print nozzles is configured to function logically independently of other physical columns of associated print nozzles on the print head.

Another implementation describes a method that involves detecting a position of a workpiece relative to a print head with multiple print elements, dividing image data that represents an image into portions according to a configuration of print elements on the printing head, and communicating along an optical communication path the divided image data to the print elements. The method also involves synchronizing a timing of printing the image on the workpiece by the print elements with the detected position of the workpiece.

The synchronization may involve using the communication of the divided image data as a trigger to cause the printing of the image substantially immediately as the data arrives at the print elements. The method may also include allocating the divided image data to different memory locations. The allocation of the divided image data to different memory locations can involve allocating the divided image data to individual memory buffers and/or allocating the divided image data to an individual memory buffer dedicated to selected print elements. The timing of the printing can include timing the arrival of the divided image data at the print elements based on the position of the workpiece. The timing of the arrival of the divided image data can include introducing a delay into the optical communication path. The introduction of the delay into the optical communication path may involve programming a direct memory access device to delay the direct memory access, transmission, and printing of the first portion of the divided image data.

Also described is a print system with a collection of print elements arranged to span a print area, and a workpiece conveyor to move a workpiece through the print area. The print system has a detector to detect a position of the workpiece in the print area, and control electronics to instruct the collection of print elements to print an image on the workpiece substantially immediately when the collection of print elements receive the instruction through an optical communication path.

The control electronics may include a transceiver to send the instruction to the collection of print elements. The collection of print elements may be a collection of inkjet print elements. The system may have a data processing device to perform operations in accordance with logic with a set of machine-readable instructions. The operations can include a division of a collection of image data into portions according to the arrangement of print elements on a print head. The system may also include a collection of memory locations to store the divided portions of image data, and a timing element to time the printing of the image data portions according to the arrangement of print elements on a print head.

Another implementation described here involves a printing apparatus with a first set of electronics to send image data to a second set of electronics on a print head, in which each set of electronics includes multiple components to enable high-speed printing on a workpiece. The printing apparatus has an optical cable connection to connect the first and second sets of electronics. Each set of electronics includes an optical connection interface. The printing apparatus has a triggering device to cause the image data to be printed substantially immediately on the workpiece as the image data from the first set of electronics arrives at the second set of electronics.

In one aspect, a complexity of design of the first set of electronics can be greater than a complexity of design of the second set of electronics. The triggering device can be configured to enable synchronous printing of image data on the workpiece as the image data arrives at the second set of electronics. The second set of electronics can be physically separated or physically remote from the first set of electronics.

The described print systems and techniques can be implemented to realize one or more of the following advantages. The process of printing images on a workpiece is synchronized with the entry of a new workpiece in the print area of a printer. When a leading edge of a new workpiece is detected, image data is sent to the print head assembly at the precise time the print element association is to deposit ink on the workpiece to generate a high-quality image on the workpiece. Poor image quality on the workpiece can be avoided by substantially eliminating excessive pauses or gaps when receiving the image data for the print head assembly. Transmission of image data to the print head assembly can serve as a trigger that causes the image data to be printed substantially immediately as the data arrives at the print head assembly.

The printing system can be a scalable architecture that can print images at high image data rates. The printing system also can be implemented with lower cost hardware and design effort. The primary printing electronics can be implemented on a personal computer (PC) (e.g., a single-board computer card) and connected through a Peripheral Component Interconnect (PCI) on a host computer. The high-speed characteristics of PC memory (e.g., RAM) can be used to reduce the amount of memory needed for the print head assembly. Moreover, the disclosed architecture enables the print head assembly to be controlled by a relative small number of components, each being processed at relatively low speeds.

A data pump can send image data to a print head assembly at high data rates to enable just-in-time printing of images on the workpieces as the workpieces move along a workpiece conveyor. Because the amount of memory can be reduced on the print head assembly, the print head assembly may be implemented at a lower cost. The type of memory used on the print head assembly may also be implemented at a lower cost. In one implementation, memory for the print head assembly can be field programmable gate array (FPGA) integrated circuit (IC), which is programmed to control the print head electronics. As a result, the costs and engineering design efforts to implement the print head assembly may be reduced due to little or no buffering of high speed image data at the print head assembly.

In one implementation, the data rate of image data sent to the printhead assembly can be scaled by having multiple data pumps connected to a single host computer. In another implementation, the system may be scalable in having multiple computers to operate in parallel to deliver higher image data rates to the print head assembly. In this implementation, each computer may have at least one PC card of control electronics connected to the PCI slot of the computer. The system may also offer scalable transmission of high bandwidth, synchronous, just-in-time image data to the print head assembly in a number of configurations, including adding multiple FPGAs to the print assembly. Because the system can handle high bandwidths of image data, the system can provide just-in-time printing of high resolution images at high conveyor speeds, large-size images at high conveyor speeds, and/or multi-color and grayscale images at high conveyor speeds.

Image data that represents an image to be printed can be divided according to the deployment of associations of print elements in a printer. The divided image data can be stored at different memory locations, depending on the deployment of the print element associations. The different memory locations can be individual memory buffers. The memory buffers can be part of associated queues of like memory buffers. The data pump can receive the image data from the different memory locations. Each physical column of associated print modules can function logically independently from the others, so that printing on the workpiece can be continuous and substantially without printing gaps. The data pump can facilitate just-in-time, synchronous transmission of image data from the host PC without the need for buffering or additional robust or powerful logic at the print head assembly. Additional data pumps can be added to the host computer to scale to higher resolutions and/or to increase bandwidth requirements. Additional parallel host computers can be added to the system to further scale printing operations.

Because each of the physical columns of associated print modules function logically independently from the others, bit manipulation does not have to be performed in the hardware of the print head assembly to achieve real-time printing of images. The system can facilitate software bit manipulation, so bit manipulation can be performed at high data rates, and engineering and material costs can be reduced.

The details of one or more implementations are set forth in the accompanying drawings and the description below. Other features and advantages of the invention will be apparent from the description and drawings, and from the claims.

DESCRIPTION OF DRAWINGS

FIG. 14 shows exemplary specifications for the data pump.

Like reference symbols in the various drawings indicate like elements.

DETAILED DESCRIPTION

Figure 1:
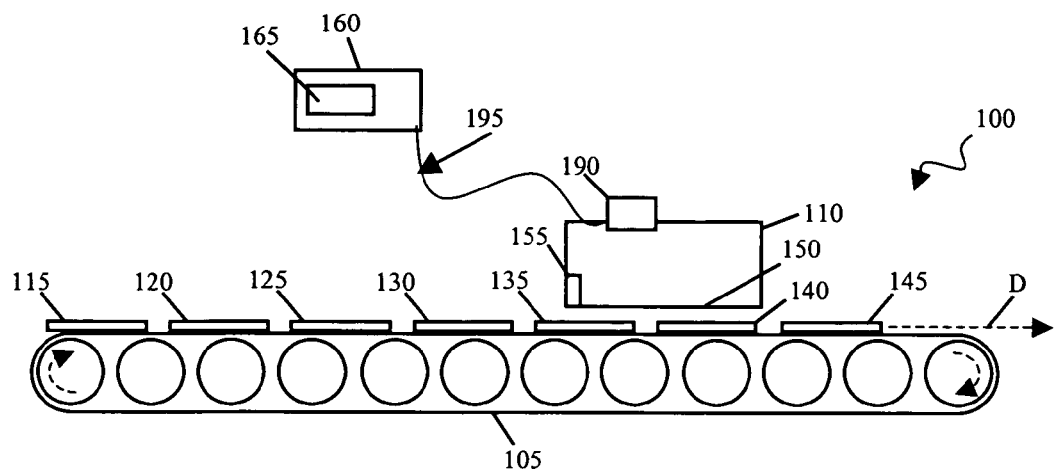
FIG. 1 shows a block diagram of a printing system.

FIG. 1 is a block diagram of a print system 100. Print system 100 includes a workpiece conveyor 105 and a printer housing 110. Workpiece conveyor 105 produces relative motion between a series of workpieces 115, 120, 125, 130, 135, 140, 145 and printer housing 110. In particular, workpiece conveyor 105 conveys workpieces 115, 120, 125, 130, 135, 140, 145 in a direction D across a face 150 of printer housing 110. Workpiece conveyor 105 can include a stepper or continuous motor that moves a roller, a belt, or other element that can retain workpieces 115, 120, 125, 130, 135, 140, 145 during conveyance. Workpieces 115, 120, 125, 130, 135, 140, 145 can be any of a number of different substrates upon which system 100 is to print. For example, workpieces 115, 120, 125, 130, 135, 140, 145 can be paper, cardboard, microelectronic devices, or foodstuffs.

Printer housing 110 houses a workpiece detector 155. Workpiece detector 155 can detect the position of one or more workpieces 115, 120, 125, 130, 135, 140, 145. For example, workpiece detector 155 can be a laser/photodetector assembly that detects the passage of edges of workpieces 115, 120, 125, 130, 135, 140, 145 across a certain point on face 150.

Located remotely from the printer housing 110 are control electronics 160. The control electronics 160 interface with the printer housing 110 by a cable 195 (e.g., an optical cable) and minimal electronics 190. Control electronics 160 control the performance of print operations by system 100. Control electronics 160 can include one or more data processing devices that perform operations in accordance with the logic of a set of machine-readable instructions. Control electronics 160 may be, for example, a personal computing system that runs image processing software and software for controlling printing at the printer housing 110.

Located within the control electronics 160 is a print image buffer 165. Print image buffer 165 is one or more data storage devices that store image data for printing by print elements. For example, print image buffer 165 can be a collection of random access memory (RAM) devices. Print image buffer 165 can be accessed by control electronics 160 to store and retrieve image data.

The control electronics 160 interface with the printer housing 110 via the cable 195 and minimal electronics 190. The control electronics 160 can send data across the cable 195, and the minimal electronics 190 can receive that data for printing at the printer housing 110. The control electronics 160 may have special circuitry (e.g., a data pump, as described in more detail in reference to FIG. 10, that can receive and/or retrieve image data from print image buffers, store the image data, and enable print elements at a printing device to receive image data in time to deposit ink on the corresponding image locations on workpieces as they are moving along a conveyor) for generating data to send to the printer housing 110. The minimal electronics 190 may be, for example, a field-programmable gate array that includes a microprocessor, transceiver, and minimal memory. The minimal electronics 190 may be connected to the printer housing 110 such that the minimal electronics 190 can be disconnected easily should the printer housing 110 and/or hardware in the printer housing 110 be changed. For example, if the printer housing 110 is replaced with a newer printer housing containing newer printing modules, the minimal electronics 190 can be disconnected from the older printer housing 110 and connected to the newer printer housing.

The printing of an image is divided between the control electronics 160 and the minimal electronics 190 such that the control electronics performs image processing and controls printing, whereas the minimal electronics 190 receives data received via the cable 195 and uses that data to cause firing of print elements at the printer housing 110. Thus, for example, image data may be converted to jetmap image data, which may include dividing the image data into multiple image queues of image buffers as part of the process of converting to jetmap image data (as described in more detail later); delays may be inserted into image data (e.g., inserting delays corresponding to a deployment of print element associations); and image data may be sent (e.g., encoding data packets of image data and sending by a receiver) at an appropriate time by the control electronics 160; whereas, the minimal electronics 190 may merely receive the image data (e.g., decode image data packets sent across the cable 195) and relay the image data such that the image data is printed on a workpiece (e.g., cause firing of inkjet nozzles according to the image data). The control electronics 160 may synchronize printing of an image at the printer housing 110. Following the previous example, the control electronics 160 may synchronize the printing of an image by receiving an indication of a leading edge of a workpiece and sending image data across the cable 195 to cause the printing of an image at the printer housing 110.

The control electronics 160 can send image data to the printer housing 110 at high data rates to enable "just-in-time" printing of images on the workpieces as the workpieces move along the workpiece conveyor 105. In one implementation of just-in-time printing, transmission of image data to the printer housing 110 can serve as a trigger that causes the image data in a packet to be printed "substantially immediately" as the data arrives at the printer housing 110. In this implementation, the image data may not be stored on a storage component on the printer housing prior to printing the image data, but can be printed as the data arrives at the printer housing. Just-in-time printing may also refer to printing image data substantially at an instant at which the image data arrives at the printer housing.

In another implementation of just-in-time printing, data received at the printer housing is stored in one or more latches, and new or subsequent data that is being received at the printer housing can serve as a trigger to print the latched data. In this implementation, the data received at the printer housing is stored in a latch until the subsequent data arrives at the printer housing, and the subsequent data arriving at the printer housing can serve as a trigger to print the data that has been latched. The data, subsequent data, and latched data may be received and/or stored at the printer housing in the form of an image data packet. In one case, the subsequent data arriving at the printer housing is the next subsequent data. Alternatively, the subsequent data arriving at the printer housing is subsequent data other than the next subsequent data, such as subsequent data arriving after the next subsequent data. Because the image data is being printed at such a high-data rate, the data printed from latched data can also refer to data being printed "substantially immediately" as the data is arriving at the printer housing.

Because the printer housing 110 has minimal electronics 190 and a reduced amount of memory, the printer housing 110 may be implemented at a lower cost. The type of memory used on the printer housing 110 may also be implemented at a lower cost. In one implementation, the type of memory implemented on the printer housing 110 is part of a field-programmable gate array (FPGA) integrated circuit (IC) that may be part of the minimal electronics 190. The costs and engineering design efforts to implement the printer housing 110 may also be reduced due to little or no buffering of high speed image data at the printer housing 110. The system 100 may offer scalable transmission of high bandwidth, synchronous, just-in-time image data to the printer housing 110 in a number of configurations, including, for example, a configuration with multiple FPGAs at the printer housing 110, each of which may implement the minimal electronics 190 and interface with one or more data pumps using one or more cables.

Figure 2:
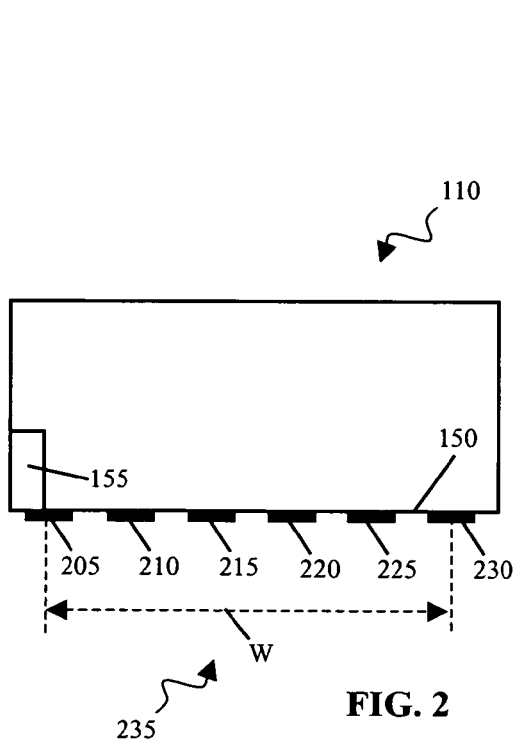
FIGS. 2 and 3 illustrate an arrangement of printer elements in the printing system of FIG. 1.
Figure 3:
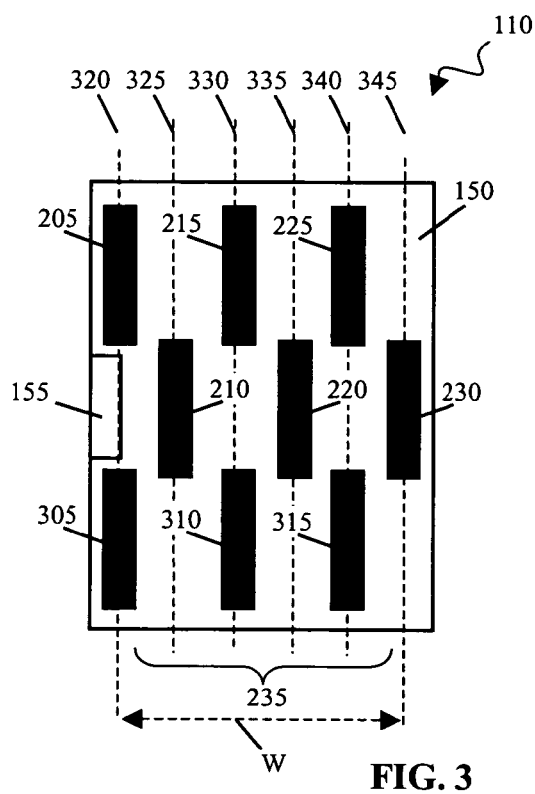

FIGS. 2 and 3 illustrate the arrangement of print modules and print elements on housing 110. In particular, FIG. 2 shows housing 110 from the side, whereas FIG. 3 shows housing 110 from below.

Housing 110 includes a collection of print modules 205, 210, 215, 220, 225, 230, 305, 310, 315 on face 150. Print modules 205, 210, 215, 220, 225, 230, 305, 310, 315 each include one or more print elements. For example, print modules 205, 210, 215, 220, 225, 230, 305, 310, 315 can each include a linear array of inkjet nozzles.

Print modules 205, 305 are arranged laterally along a column 320. Print module 210 is arranged along a column 325. Print modules 215, 310 are arranged laterally along a column 330. Print module 220 is arranged along a column 335. Print modules 225, 315 are arranged laterally along a column 340. Print module 230 is arranged along a column 345. This arrangement of print modules 205, 210, 215, 220, 225, 230, 305, 310, 315 along columns 325, 330, 335, 340, 345 spans an effective print area 235 on face 150. Effective print area 235 has a longitudinal width W that spans from the print elements in print modules 205, 305 to the print elements in print module 230.

Print modules 205, 210, 215, 220, 225, 230, 305, 310, 315 can be deployed in print element associations to print selected components of an image. For example, print modules 205, 210, 305 can be deployed in a first print element association to print a first color across the entire lateral expanse of a substrate moving across face 150, print modules 215, 220, 310 can be deployed in a second print element association to print a second color across the entire lateral expanse, and print modules 225, 230, 315 can be deployed in a third print element association to print a third color across the entire lateral expanse.

As another example, the group of print modules 205, 210, 215, 220, 225, 230, 305, 310, 315 can be deployed in print element associations based on the columnar position of the constituent print elements in the modules. For example, a first print element association can include modules 205, 305 deployed so that their constituent print elements are arranged in a single column. A second print element association can include only print module 210. Modules 215, 310 can form a third association. Associations four, five, and six include modules 220, 225 and 315, and 230, respectively. Forming associations of print elements in this columnar manner allows the printing of back-to-back dissimilar images with variable but small or nonexistent non-printed area between finished image areas, relative to longitudinal width W, without need for complex real-time adjustments in image data.

As another example, the group of print modules 205, 210, 215, 220, 225, 230, 305, 310, 315 can be deployed in print element associations based on the lateral position of the constituent print elements in the modules. For example, a first print element association can include modules 205, 210, 305 deployed so that their constituent print elements are shifted in lateral position relative to the print elements in modules 215, 220, 310 and to the print elements in modules 225, 230, 315. A second print element association can include print modules 215, 220, 310 deployed so that their constituent print elements are shifted in lateral position relative to the print elements in modules 205, 210, 305 and to the print elements in modules 225, 230, 315. Modules 225, 230, 315 can form a third association. The relative shifts in position can be smaller than the lateral spacing of the print elements in the modules to, in net effect, decrease the lateral spacing between print elements on housing 110 and thereby effectively increase the resolution at which an image can be printed.

As another example, groups of print modules can be deployed in print element associations based on the lateral expanses covered by the print modules. For example, a first print element association can include modules 205, 305, 215, 310, 225, 315 deployed to cover the laterally outer expanses of a workpiece. A second print element association can include print modules 210, 220, 230 deployed to cover the laterally central expanses of a workpiece.

As another example, groups of print elements can be deployed in print element associations based on a combination of these and other factors. For example, groups of print elements can be deployed in a print element association based on their printing the color cyan on an outer extent of a workpiece. As another example, groups of print modules can be deployed in a print element association based on their constituent print elements printing at certain lateral positions on the laterally outer expanses of a workpiece.

Each print element association can have a dedicated memory location in print image buffer 165 (shown in FIG. 1) in that the association prints image data that once resided in the memory location. For example, when print image buffer 165 is a collection of queues of individual buffers, each print element association can have an individual, dedicated queue of buffers.

Figure 4:
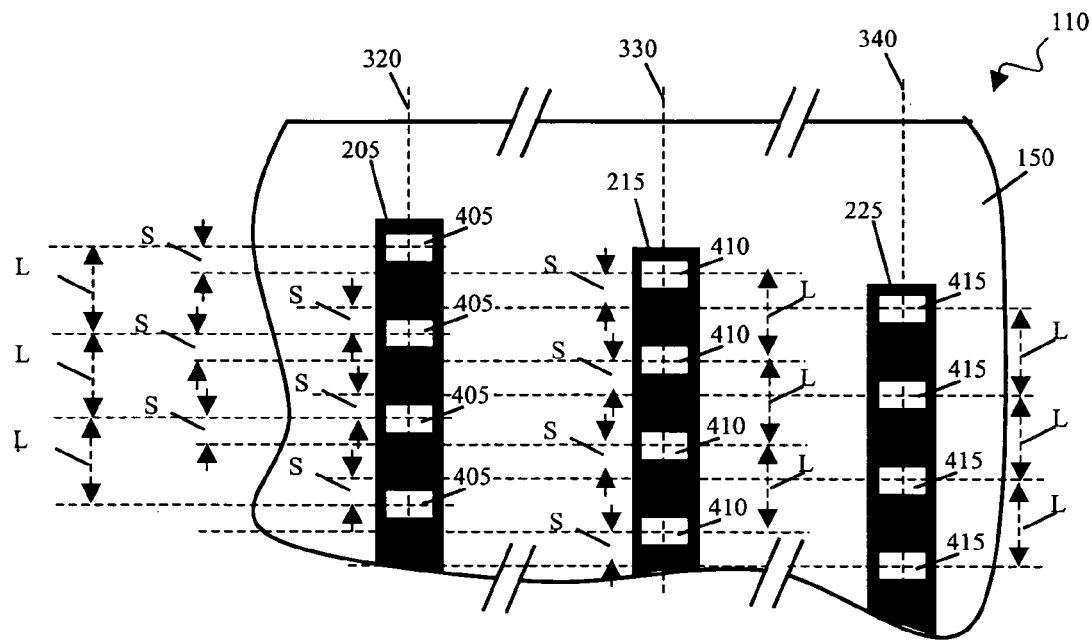
FIG. 4 schematically illustrates the deployment of print elements with relative shifts in lateral position.

FIG. 4 schematically illustrates a deployment of print elements with relative shifts in lateral position. The illustrated portion of housing 110 includes print modules 205, 215, 225. Print module 205 includes an array of print elements 405 laterally separated from one another by a distance L. Print module 215 includes an array of print elements 410 laterally separated from one another by a distance L. Print module 225 includes an array of print elements 415 laterally separated from one another by a distance L.

Print elements 405 are shifted relative to the lateral position of print elements 410 by a shift distance S. Print elements 405 are shifted relative to the lateral position of print elements 415 by shift distance S. Print elements 410 are shifted relative to the lateral position of print elements 415 by shift distance S. Shift distance S is smaller than distance L, and the net effect of the relative lateral shifts between print elements 405, print elements 410, and print elements 415 is to decrease the overall lateral spacing between print elements on face 150 of housing 110.

Figure 5:
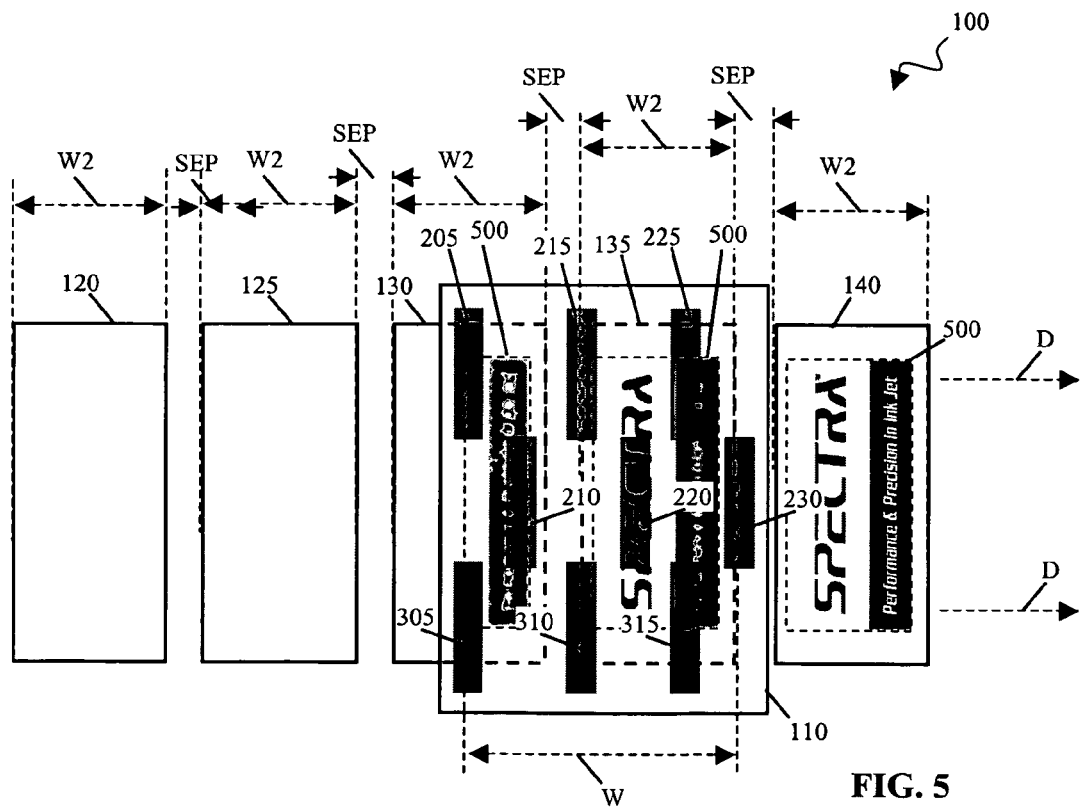
FIG. 5 schematically illustrates the serial printing of an image on different workpieces.

FIG. 5 schematically illustrates the serial printing of an image 500 on two or more different workpieces using print system 100. A series of workpieces 120, 125, 130, 135, 140 is conveyed across effective print area 235 on face 150 of printer housing 110 for printing. Image 500 can be serially printed in that image 500 can be printed sequentially on workpieces 120, 125, 130, 135, 140 (i.e., the same image is printed, in succession, on various workpieces).

Workpieces 120, 125, 130, 135, 140 each have a longitudinal width W2. Workpiece width W2 is smaller than width W of effective print area 235. A leading edge of workpiece 120 is separated from a trailing edge of workpiece 125 by separation distance SEP. A leading edge of workpiece 125 is separated from a trailing edge of workpiece 130 by separation distance SEP. A leading edge of workpiece 130 is separated from a trailing edge of workpiece 135 by separation distance SEP. A leading edge of workpiece 135 is separated from a trailing edge of workpiece 140 by separation distance SEP. The separation distance SEP may be smaller than width W of effective print area 235. The separation distance SEP may be zero. As such, both workpiece 130 and workpiece 135 may be positioned in effective print area 235 simultaneously and be printed on at the same time.

System 100 has partially printed image 500 on both workpiece 130 and workpiece 135. Such serial printing of image 500 on two or more different workpieces using a single effective print area speeds the throughput of workpieces in system 100.

Figure 6:
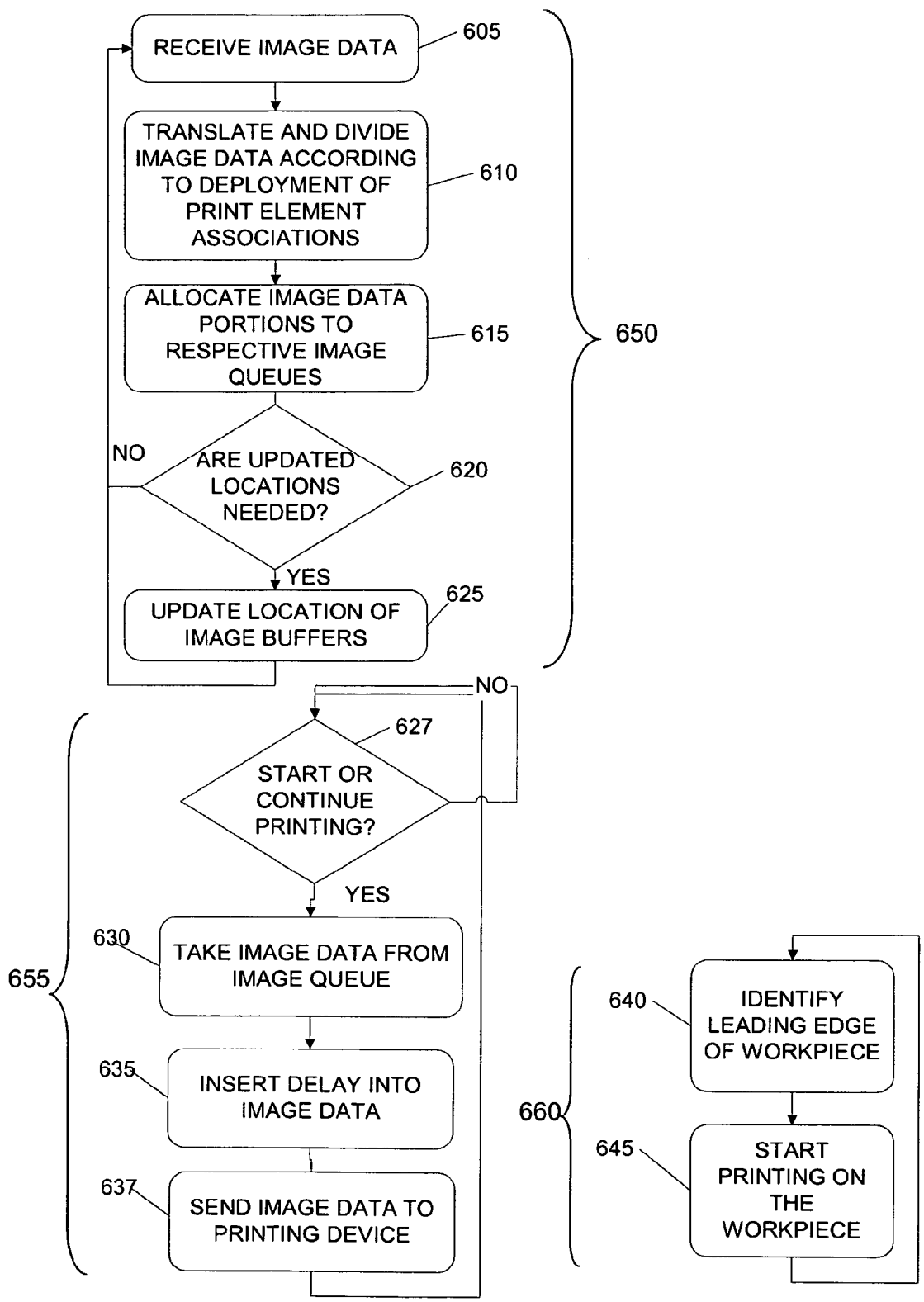
FIG. 6 is a flowchart of a process for the serial printing of an image on different workpieces.

FIG. 6 includes flowcharts of processes 650, 655, 660 for the serial printing of an image on two or more different workpieces using a single effective print area. Processes 650, 655, 660 can be performed in whole or in part by a data processing apparatus and/or circuitry configured to exchange data with a buffer and control printing by print elements. In system 100, processes 650, 655, 660 can be performed by control electronics 160 using input received from workpiece conveyor 105 and workpiece detector 155. Within the control electronics 160, different processes may be performed by different parts of the system 100. For example, the process 650 may be performed by software operating in the control electronics 160 and the processes 655 and 660 may be performed by a data pump. The processes of 650, 655, and 660 are separate to indicate that they can be performed concurrently and/or independently of each other.

The system performing the process 650 receives image data at 605. The image data can be a stand-alone collection of data regarding an individual image. For example, the image data can be a graphic image format (gif) file, a joint photographic experts group jpeg) file, PostScript, Printer Command Language (PCL), or other image data collection.

The system can then translate and divide the received image data according to a deployment of associated print elements at 610. The image data can be translated before it is divided, divided before it is translated, or translated and divided as part of the same process. The translation of image data can include, for example, a conversion of image data into a format understandable by a printing device, such as bitmap raster data, and a further conversion of the bitmap raster data into jetmap data. Converting bitmap raster image data into jetmap data involves taking an input bitmap, which is arranged in an order corresponding to a geographic order used by the bitmap image format, and rearranging the bitmap raster image data to correspond to physical locations of the print elements. It may also involve dividing the image data as part of the process of converting the bitmap raster image data to jetmap data (i.e., the jetmap data is divided into image buffers corresponding print element associations). As an example, the process at 610 may include converting jpeg formatted image data to bitmap formatted image data, and then converting the bitmap formatted image data into jetmap image data as image buffers corresponding to print element associations. In an alternative implementation, image data may be converted directly to jetmap data without first converting to an intermediary format.

The division of image data according to the deployment of associated print elements can include the identification of portions of the image data that are to be printed by an association of print elements based on the deployment of the association.

Figure 7:
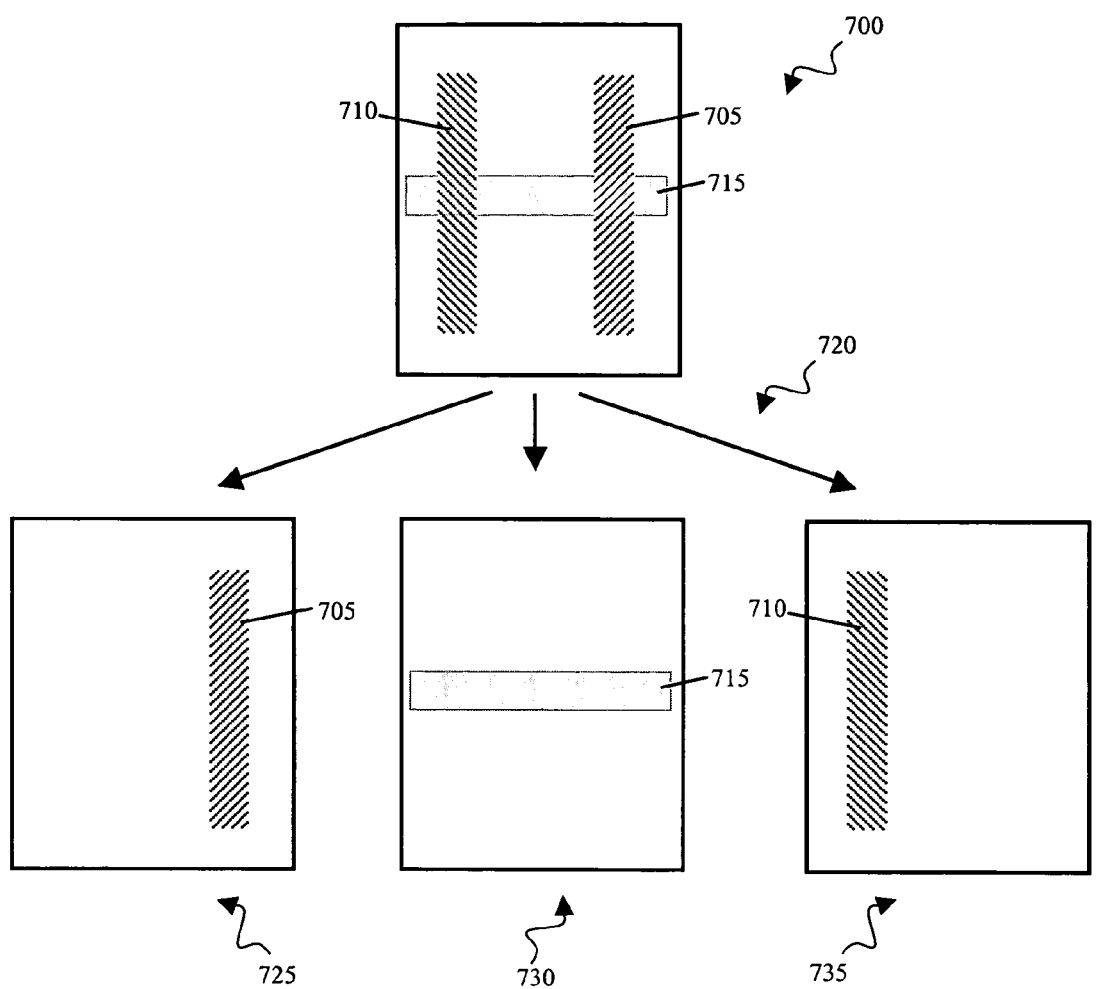
FIGS. 7, 8, and 9 illustrate implementations of the division of image data according to the deployment of associated print elements.

FIG. 7 illustrates one implementation of the division of image data representing an image 700 according to a deployment of print element associations. Image 700 includes a cyan line 705, a magenta line 710, and a yellow line 715. Cyan line 705 is printable by an association of print elements deployed to print cyan. Magenta line 710 is printable by an association of print elements deployed to print magenta. Yellow line 715 is printable by an association of print elements deployed to print yellow.

When the image data representing image 700 is divided (indicated by arrows 720), three individual collections of data representing images 725, 730, 735 are formed. Image 725 includes cyan line 705 and is thus printable by an association of print elements deployed to print cyan. Image 730 includes yellow line 715 and is thus printable by an association of print elements deployed to print yellow. Image 735 includes magenta line 710 and is thus printable by an association of print elements deployed to print magenta. Thus, the image data representing images 725, 730, 735 are the result of a division of data representing image 700 according to the deployment of associations of print elements to print different colors.

Figure 8:
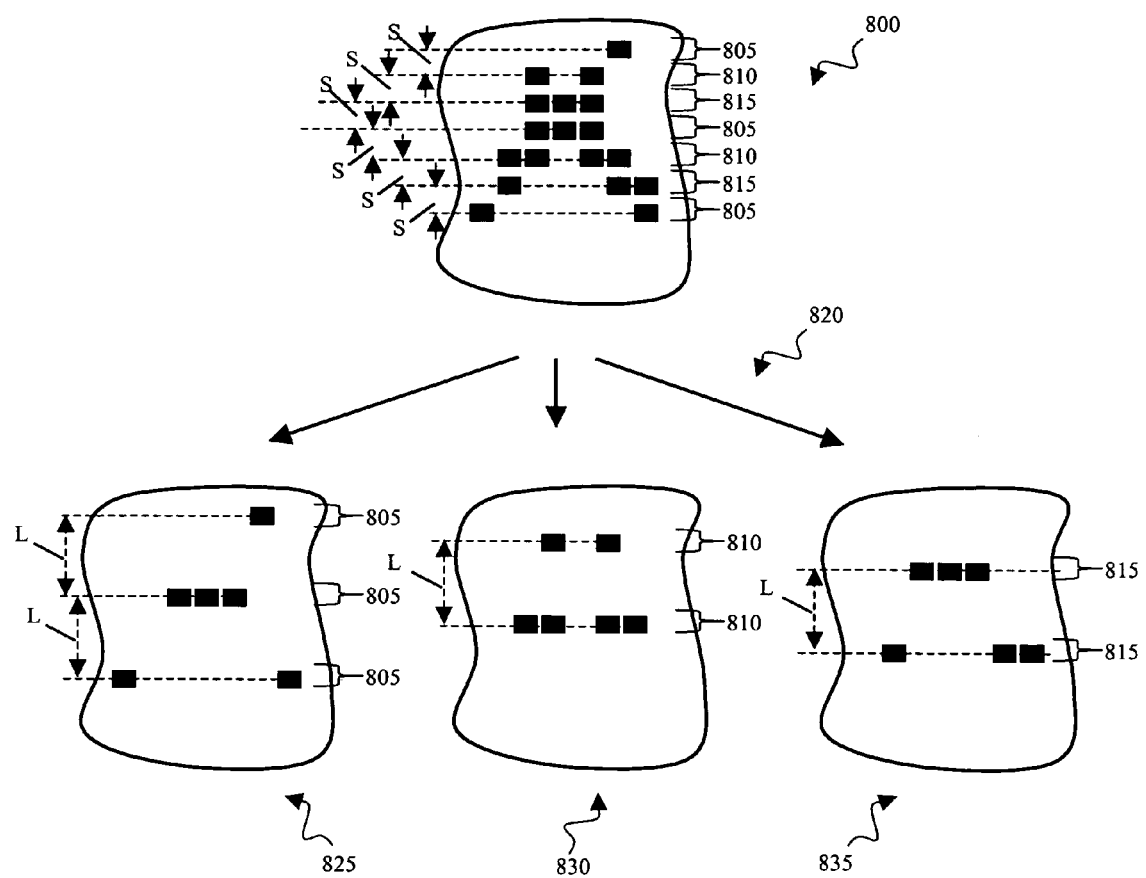

FIG. 8 illustrates another implementation of the division of image data (namely, image data representing a portion of an image 800) according to a deployment of print element associations. In particular, a division according to a deployment of print elements with relative shifts in lateral position is illustrated. The shifts in the lateral position of print elements can correspond to the lateral shifts S between print elements 405, print elements 410, and print elements 415 in the implementation of housing 110 shown in FIG. 4.

Image portion 800 includes collections of pixel rows 805, 810, 815. Pixel rows 805, 810, 815 each include a longitudinal row of pixels. Pixel rows 805 are laterally shifted relative to the position of pixel rows 810 by a shift distance S. Pixel rows 805 are laterally shifted relative to the position of pixel rows 815 by shift distance S. Pixel rows 810 are laterally shifted relative to the position of pixel rows 815 by shift distance S. Shift distance S (and hence the lateral resolution of the printed imaged) is determined by the overall lateral spacing between print elements.

When a workpiece is moved longitudinally across an array of print elements, each pixel row 805, 810, 815 can be printed by an individual print element. For example, when image portion 800 is printed using the implementation of housing 110 shown in FIG. 4, a single print element 405 can print a single pixel row 805, a single print element 410 can print a single pixel row 810, and a single print element 415 can print a single pixel row 815.

When the image data representing image portion 800 is divided (indicated by arrows 820), three individual collections of data representing image portions 825, 830, 835 are formed. Image portion 825 includes pixel rows 805 and is thus printable by a first array of print elements separated by a lateral distance L. Image portion 830 includes pixel rows 810 and is thus printable by a second array of print elements separated by a lateral distance L. Image portion 835 includes pixel rows 815 and is thus printable by a third array of print elements separated by a lateral distance L. The print elements in these arrays are shifted in lateral position relative to one another. Thus, the image data representing image portions 825, 830, 835 are the result of a division of data representing image portion 800 according to the deployment of associations of print elements to print at different lateral positions.

Figure 9:
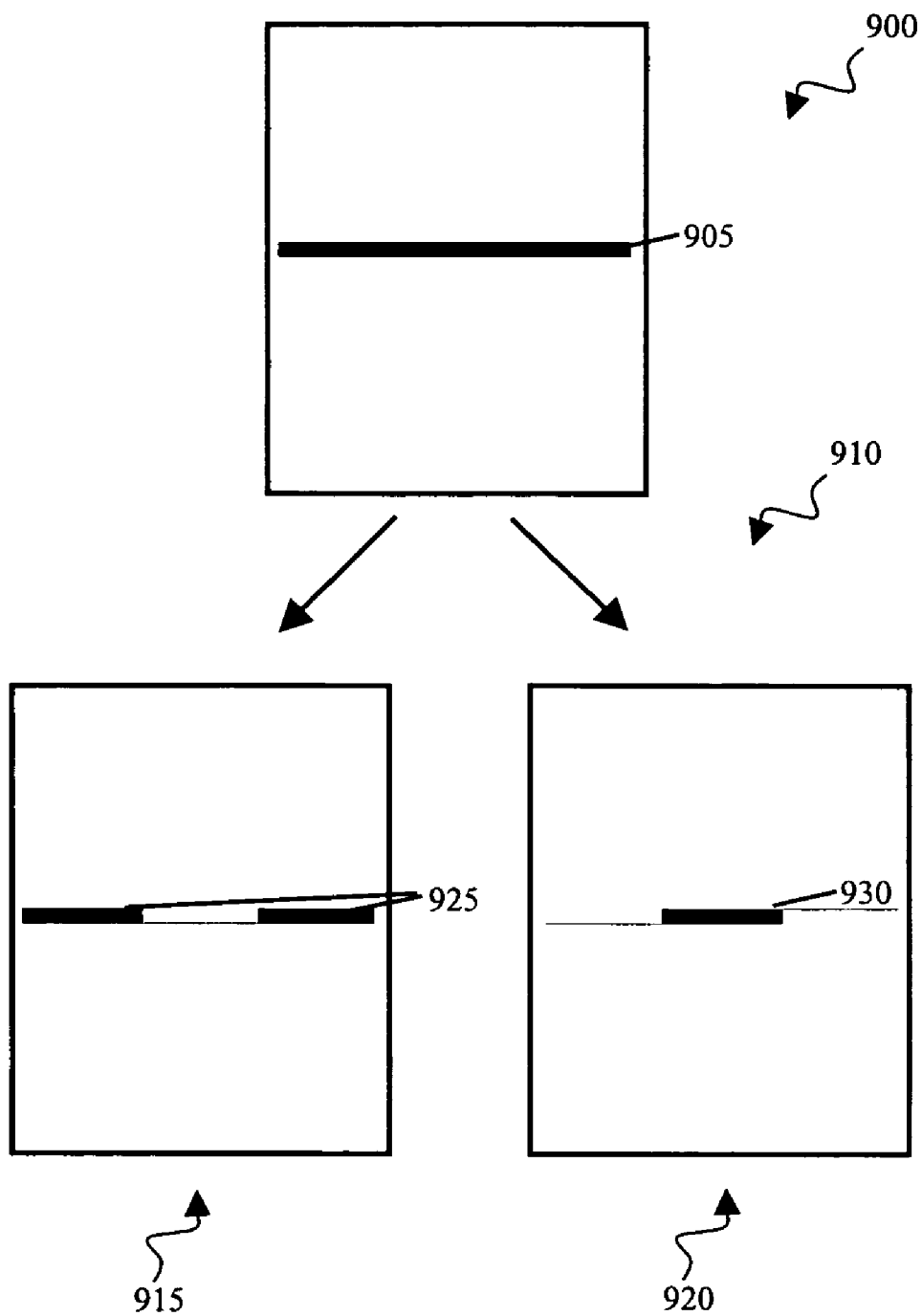

FIG. 9 illustrates another implementation of a division of image data representing an image 900 according to a deployment of print element associations. Image 900 includes a single line 905 that spans the entire lateral expanse of image 900.

When the image data representing image 900 is divided (indicated by arrows 910), two individual collections of data representing images 915, 920 are formed. Image 915 includes two outer line portions 925 and is thus printable by an association of print elements deployed toward the outside of a workpiece. For example, outer line portions 925 may be printable by an association that includes print modules 205, 305, by an association that includes print modules 215, 310, or by an association that includes print modules 225, 315 (FIG. 3).

Image 920 includes a central line portion 930 and is thus printable by an association of print elements deployed toward the center of a workpiece. For example, central line portion 930 may be printable by an association that includes print module 210, by an association that includes print module 220, or by an association that includes print module 230 (FIG. 3). Thus, the image data representing images 915, 920 are the result of a division of data representing image 900 according to the deployment of associations of print elements to print different lateral expanses.

Returning to FIG. 6, the system performing process 650 allocates the image data portions that result from a division to respective image queues at 615. In other words, the allocation results in each buffer of image data being allocated to a respective queue. In general, each buffer of image data corresponds to an association of print elements at a printing device. Similarly, a set of buffers corresponds to a set of image data to be printed by the print element associations. The buffers of image data, which were generated at 610, are queued in queues, with each queue corresponding to a print element association. For example, if there are eight image queues, each image queue corresponding to a print element association, then a set of buffers of image data that correspond to the first print element association may be allocated to the first image queue, a set of buffers of image data that correspond to the second print element association may be allocated to the second image queue, and so on. The memory locations where the image queues and the buffers are located can be dedicated to the storage of image data for printing by a specific print element association. For example, the memory locations may be blocked off from memory management by an operating system and the memory locations may be accessible by a data pump using direct memory access. The queues for the buffers of image data may be first in first out queues (i.e., FIFO queues).

At 620, the system performing process 650 determines whether the system should update the locations indicating where the print image buffers (i.e., buffers of image data) are located. For example, the system might update locations at one or more data pumps. In that example, the data pumps can store a location indicating where print buffers are located at each of the image queues so the data pumps are able to access each of the memory devices where the buffers are located and retrieve image data. If, at 620, the system determines that the locations should be updated, the locations are updated with references to the buffers at 625. Otherwise, image-data is received at 605 and the process continues. Also, the process continues at 605 if updated locations are not needed at 620. In some implementations, the process of 650 may stop, for example, if there are no more images to receive (e.g., no more images to print), or if the image queues are full.

A determination is made as to whether printing should start or continue at 627. If not, the process continues at 627. If so, at 630, image data may be retrieved from buffers in the image queues. For example, a data pump may retrieve buffers of image data. In that example, the data pump is able to identify the proper buffers because the locations of the buffers may be updated at the data pump at 625. A sufficient amount of image data for one impression of an association of print elements may be retrieved. Thus, image data may be retrieved from each of the image queues. In alternative implementations, portions of image data representing a portion of a single impression may be retrieved. Similarly, portions of image data representing several impressions may be retrieved. In those implementations, a queue, such as a FIFO queue, may store image data (e.g., sets of buffers of image data).

At 635, positional delays are added to selected portions of image data. The delays are upfront delays that align image data with the associations of print elements to which respective portions of image data correspond. Thus, the extent of the up front delay can be determined based on the deployment of the print element association to which image data corresponds. For example, a minimal positional delay or no delay at all may be inserted into image data that corresponds to a print element association near the entry of workpieces across an effective print area, whereas a larger positional delay may be inserted into image data that corresponds to a print element association near the exit of workpieces across an effective print area. Because the positional delays correspond to the position of print element associations (or rather, the separation distance between print element associations), the positional delays may differ depending on a type of print head assembly that contains the print element associations. In any case, the positional delays may be a fixed delay(s) for a particular print head assembly and the delays may be measured in an amount corresponding to an amount of print lines.

Inserting an upfront delay into image data can be performed in a number of different ways. For example, an appropriate amount of null "placeholder" data can be inserted before and after the image data portions that result from a division of image data. As another example, the upfront delay can be introduced into a data communication path between a memory location and print elements. For example, a data pump may be aligned such that the data pump can insert different upfront delays for different portions of image data at different memory locations. Image data with delays may be sent to a printing device at 637. In alternative implementations, image data with delays may be added to a queue (e.g., a first in first out queue) prior to sending the data to a printing device. The process at 655 may continue at the process of 627 after image data is sent at 637. In some implementations, the process at 655 may stop after image data is sent at 637 for various reasons. For example, if all image data packets have been sent by a data pump, the data pump may determine at 627 that the system should no longer be printing (i.e., determine not to start or continue printing). In some implementations, empty data image packets may be sent, effectively causing no ink to be deposited on a workpiece.

The system can identify the entry of a leading edge of a workpiece to an effective print area of a print system at 640. The entry of the leading edge can be identified using a workpiece detector (such as workpiece detector 155 (FIG. 1)). The further progress of the workpiece across the effective print area can be followed by sensing the speed of the workpiece, e.g., by measuring the speed of a workpiece conveyor (such as workpiece conveyor 105 (FIG. 1)) using a rolling encoder.

When the workpiece is appropriately positioned, the print system performing process 660 can commence printing of the workpiece at 645. The printing of the workpiece can include relaying image data that has been divided according to the deployment of the print element association. The image data can be relayed from a memory location to the appropriate print element association. The relaying can be driven by a central data processing device, such as a central data processing device in control electronics 160. The relaying can be done on a firing-by-firing basis. In the processes shown in the flowcharts of FIG. 6, a signal may be sent to the system performing the process of 655 (e.g., a data pump) to start printing, causing a relaying of image data to a printing device.

As the workpiece moves across the effective print area, different print elements can be triggered by the same trigger signal to fire at the same instant. Alternatively, different print elements can be staggered to fire at different instants. Regardless of when the actual firing of individual elements occurs, the elements in the effective print area are printing on the initial workpiece at the same time.

In a print system where the effective print area has a longitudinal width that is greater than the separation distance to the next workpiece, one or more workpieces may be positioned beneath the effective print area at the same time. As such, more than one workpiece may be available for serial printing. One example of this situation is illustrated in FIG. 5, where the separation distance SEP between workpieces is smaller than width W of effective print area 235, and, both workpiece 130 and workpiece 135 are positioned beneath effective print area 235 and available to be printed in series.

In such a print system, the system performing process 660 can also identify the entry of the leading edge of a next workpiece at 640. The entry of the leading edge can be identified using a workpiece detector (such as workpiece detector 155 (FIG. 1)). The progress of both an initial workpiece and the next workpiece across the effective print area can be followed by sensing the speed of the workpieces, e.g., by measuring the speed of a workpiece conveyor (such as workpiece conveyor 105 (FIG. 1)).

Printing on both workpieces can continue as the initial workpiece and the next workpiece continue to progress across the effective print area. When the effective print area has a longitudinal width that is greater than the sum of the width of a next workpiece and twice the separation distance between workpieces, an initial workpiece, the next workpiece, and yet another workpiece may be positioned beneath the effective print area at the same time. As such, three workpieces may be available for printing in series. In this case, the system performing process 660 can identify the leading edge of another "next workpiece" at 640 before stopping printing on an initial workpiece. Otherwise, the system can stop printing on the initial workpiece before identifying the leading edge of another "next workpiece" at 640.

In some implementations, image data may be divided based on associations of print modules. In some implementations, print element associations may be split across a single print module. For example, if each print module in a print system includes two rows of print elements, image data may be divided by the rows of print elements. Thus, a space between workpieces may be reduced to zero.

In some implementations, the system(s) performing processes shown in FIG. 6 can calculate the positional delay required between print element associations (rather than having a fixed delay). The memory locations can be dedicated to specific print element associations. For example, individual buffers can store image data for printing by individual print element associations. The system performing processes shown in FIG. 6 can control a data pump or other hardware device to extract data from memory locations at the appropriate point in time to properly place image data on a workpiece on which the image data is to be printed.

Although the processes of FIG. 6 are shown as being composed of a certain number and type of processes, additional and/or different processes can be used instead. For example, in the process of 655, rather than continually determining whether to continue or start printing at 627, the system performing the process of 655 may start printing when started and stop printing when the system decides to stop printing, only to start printing when called on again. Similarly, the processes need not be performed in the order depicted, or by the components that were discussed to have performed certain processes.

Figure 10:
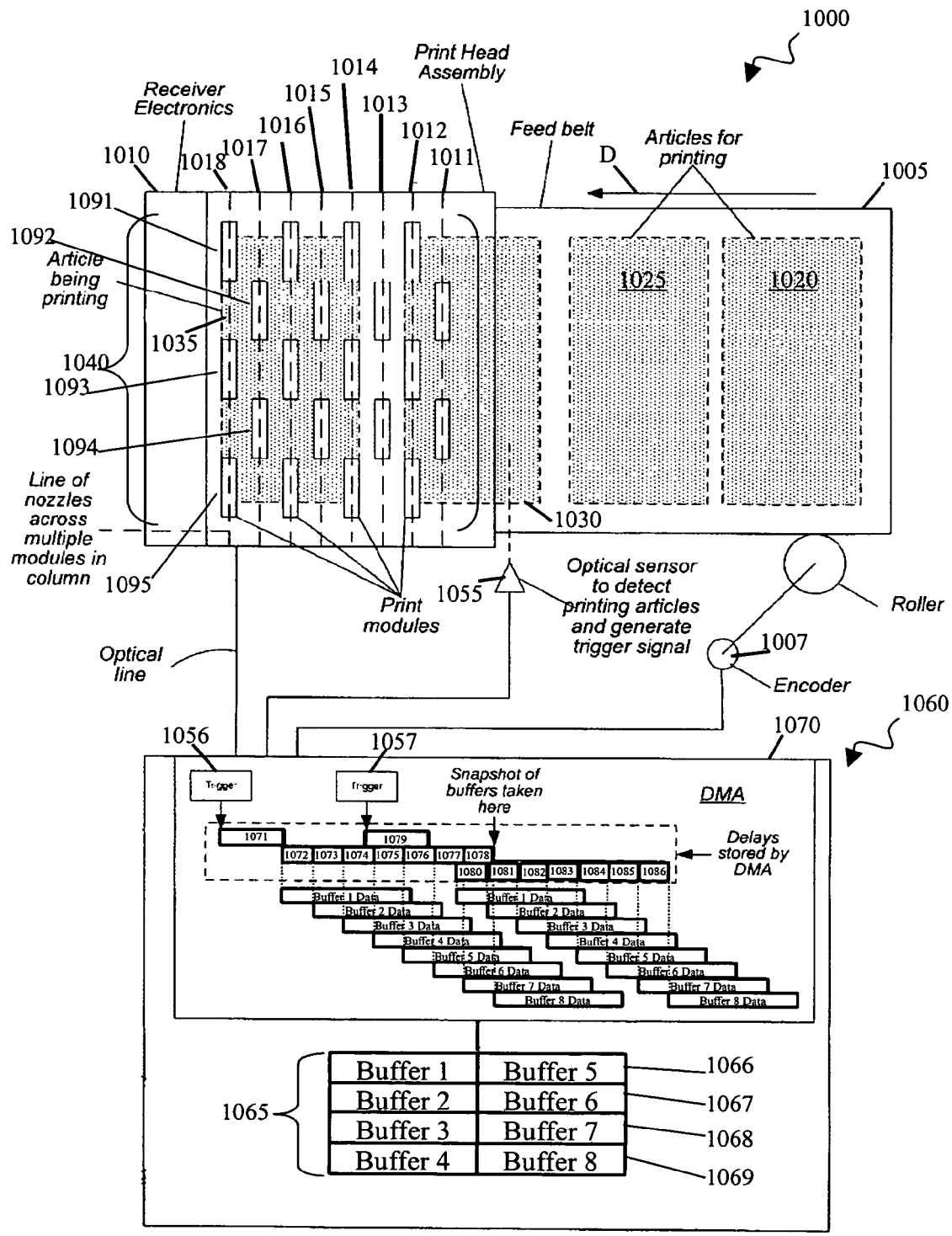
FIG. 10 shows a schematic representation of an implementation of a printing system.

FIG. 10 shows a schematic representation of an implementation of a print system 1000. System 1000 includes workpiece conveyor 1005, a printer housing 1010, a workpiece detector 1055, and control electronics 1060.

Workpiece conveyor 1005 conveys workpieces 1020, 1025, 1030, 1035 in a direction D across an effective print area 1040 of printer housing 1010. Workpiece conveyor 1005 includes an encoder 1007 that senses the speed of workpieces 1020, 1025, 1030, 1035. Encoder 1007 also generates a signal that encodes the sensed speed and relays the signal to control electronics 1060. Workpiece detector 1055 is an optical sensor that detects the position of one or more workpieces 1020, 1025, 1030, 1035, and generates trigger signals (such as trigger signals 1056 and 1057) based upon that detection.

Printer housing 1010 includes a collection of print modules arranged laterally along a series of columns 1011, 1012, 1013, 1014, 1015, 1016, 1017, 1018. This arrangement of print modules spans an effective print area 1040. Each group of print modules deployed along each of columns 1011, 1012, 1013, 1014, 1015, 1016, 1017, 1018 constitutes a print element association. As examples, print modules 1091, 1093, 1095 constitute a print element association along column 1018, and print modules 1092, 1094 constitute a print element association along column 1017.

Control electronics 1060 controls the performance of print operations by system 1000. Control electronics 1060 includes a collection of print image buffers 1065. Control electronics 1060 can access the print image buffers in collection 1065 to store and retrieve image data. In the configuration shown in FIG. 10, there are eight print image buffers in collection 1065, and each print image buffer is dedicated to a print element association arranged along one of columns 1011, 1012, 1013, 1014, 1015, 1016, 1017, 1018. For example, print image buffers 1066, 1067, 1068, 1069 may correspond to the print element associations arranged along columns 1015, 1016, 1017, 1018, respectively. In particular, each print element association prints image data only from the associated print image buffer.

Control electronics 1060 also includes a data pump 1070. A "data pump" refers to a functional component, e.g., implemented in hardware, software, programmable logic or a combination thereof, that processes data and transmits it to one or more printing devices for printing. In one implementation, the data pump can refer to a direct memory access (DMA) device. The data pump 1070 is positioned along the data communication path between the print element associations and their dedicated print image buffers in collection 1065. The data pump 1070 can receive and store image data from each print image buffer in collection 1065. The data pump 1070 is programmable by control electronics 1060 to delay the communication of information from the print image buffers in collection 1065 to the print element associations.

In operation, control electronics 1060 can divide image data according to the deployment of print element associations in effective print area 1040. Control electronics 1060 can also allocate the divided image data to an appropriate print image buffer in collection 1065.

As workpiece 1035 is conveyed by workpiece conveyor 1005 to enter effective print area 1040, workpiece detector 1055 detects the leading edge of workpiece 1035 and generates trigger signal 1056. Based on receipt of trigger signal 1056, control electronics 1060 can program data pumps 1070 with positional delays 1071, 1072, 1073, 1074, 1075, 1076, 1077, 1078. Delay 1071 delays the communication of image data from a first print image buffer in collection 1065 to the print element association arranged along column 1011. Delay 1072 delays the communication of image data from a second print image buffer in collection 1065 to the print element association arranged along column 1012. Delays 1073, 1074, 1075, 1076, 1077, 1078 delay the communication of image data from respective print image buffers in collection 1065 to the print element associations arranged along columns 1013, 1014, 1015, 1016, 1017, 1018.

As workpiece 1035 is conveyed by workpiece conveyor 1005 across effective print area 1040, the print element associations arranged along columns 1011, 1012, 1013, 1014, 1015, 1016, 1017, 1018 successively print. In particular, as workpiece 1035 is advanced one scan line across effective print area 1040, the data pump 1070 dumps image data to the appropriate receiver electronics at the print element associations arranged along columns 1011, 1012, 1013, 1014, 1015, 1016, 1017, 1018 (i.e., the data pump 1070 causes the image data to be transmitted to the printing device). The dumped image data identifies print elements that are to fire for the instantaneous position of workpiece 1035 in effective print area 1040 (the identification of print elements may be implicit; e.g., an ordering of image data in a data packet in a format corresponding to an order of print elements and/or print element associations at a printing device). Data for successive firings can be loaded from print image buffers in collection 1065 to the data pump 1070 during firings.

While workpiece 1035 is still being printed, workpiece 1030 can be conveyed by workpiece conveyor 1005 to enter effective print area 1040. Workpiece detector 1055 detects the leading edge of workpiece 1030 and generates trigger signal 1057. Based on receipt of trigger signal 1057, control electronics 1060 may cause the data pump 1070 to insert delays 1079, 1080, 1081, 1082, 1083, 1084, 1085, 1086. Delay 1079 delays the communication of image data from a first print image buffer in collection 1065 to the print element association arranged along column 1011. Delay 1080 delays the communication of image data from a second print image buffer in collection 1065 to the print element association arranged along column 1012. Delays 1081, 1082, 1083, 1084, 1085, 1086 delay the communication of image data from respective print image buffers in collection 1065 to the print element associations arranged along columns 1013, 1014, 1015, 1016, 1017, 1018. Alternatively, delays may already be inserted into image data and the trigger signal may cause the sending of image data by the data pump 1070.

As workpiece 1030 is conveyed by workpiece conveyor 1005 into effective print area 1040, the print element associations arranged along columns 1011, 1012, 1013, 1014, 1015, 1016, 1017, 1018 print upon workpieces 1030, 1025. In particular, as workpieces 1035, 1030 are advanced one scan line, the data pump 1070 dumps image data to the appropriate receiver electronics for the print element and workpieces 1035, 1030 are printed at the same time.

Image data for each workpiece may differ. For example, if two workpieces were to have two different images printed upon them, different image data representing different images would be used to print on each workpiece. In that example, two sets of image data may be gathered at a data pump. A first set of image data may correspond to a first image (e.g., a print line of an image of a frog) and a second set of image data may correspond to a second image (e.g., three print lines of an image of an apple). Gathering the image data may include taking image data from image queues and/or generating a data packet that comprises the first and second sets of image data. The gathered image data may be provided to the print element associations by sending a data packet to the printing device that includes the print element associations (e.g., a data packet include the print line of the image of the frog and the three print lines of the image of the apple). When the two workpieces are printed at substantially the same time, a first portion of the print buffers (e.g., print buffer 1066) may store the first set of image data corresponding to the first image (e.g., the print line of the image of the frog) and a second portion of the print buffers (e.g., print buffers 1067, 1068, 1069) may store the second set of image data corresponding to the second image (e.g., the three print lines of the image of the apple). A first set of print elements corresponding to the first set of print buffers (e.g., the print elements in the association of print elements along column 1015) can print the first image (e.g., the print line of the image of the frog) and a second set of print elements corresponding to the second set of buffers (e.g., the print elements in the associations of print elements along columns 1016, 1017, 1018) can print the second image (e.g., the three print lines of the image of the apple). As such, different print elements print two images at substantially a same time (e.g., print elements along the columns 1015, 1016, 1017, 1018 may fire at substantially a same time).

Or, the image data for each workspace may represent the same image. For example, the same image may be continually printed on multiple workpieces. In that example, if two workpieces are printed at substantially a same time, different portions of the same image may reside in different sets of print buffers such that different print elements print different portions of the same image.

Although not shown, in addition to using different sets of print elements to print different portions of image data on different workpieces, a same workpiece may be printed on with different sets of image data.

The process of printing images on a workpiece is synchronized with the entry of a new workpiece in the print area. When a leading edge of a new workpiece is detected, and the control electronics is notified of the new workpiece, data pump 1070 dumps image data to the print head assembly at the precise time the print element association is to deposit ink on the workpiece to generate a high-quality image on the workpiece. Poor image quality on the workpiece is avoided due to no undue pauses or gaps when receiving the image data for the print head assembly.

In one implementation, the printing system 1000 can be a scalable architecture that can print images at high image data rates. The control electronics 1060 can be implemented on a personal computer (PC) card that is connected into a Peripheral Component Interconnect (e.g., a PCI-type interconnection system) in the personal computer. The high-speed characteristics of PC memory (e.g., RAM) can be used to reduce an amount of memory for the print head assembly.

The data pump 1070 can send image data to the print head assembly at high data rates to enable just-in-time printing of images on the workpieces as the workpieces move along the conveyor. Because the amount of memory can be reduced on the print head assembly, the print head assembly may be implemented at a lower cost. The type of memory used on the print head assembly may also be implemented at a lower cost. In one implementation, the type of memory implemented on the print head assembly is a floating-point gate array (FPGA) integrated circuit (IC). The costs and engineering design efforts to implement the print head assembly may also be reduced due to little or no buffering of high speed image data at the print head assembly.

In one implementation, the data rate of image data sent to the print head assembly can be scaled. For example, a personal computer may have multiple PC cards of control electronics 1060 for the print head assembly by having each PC card of control elections 1060 connected into a PCI slot of the computer. For instance, two-sided newspaper printing may require 2 Gb/s of image data to be sent to the print head assembly to enable just-in-time printing of an image on a workpiece. If the data pump 1070 for each of the control electronics 1060 is able to send around 1 Gb/s of image data to the print head assembly then 2 data pumps can be connected in parallel in corresponding PCI slots to deliver the 2 Gb/s for just-in-time printing of the two-sided newspaper image. In this example, each PC card of control electronics 1060 may have an optical connection to the print head assembly. In one implementation, the top and bottom sides of the workpiece can receive 1 color printed on each side.

In another implementation, the system 1000 may be scalable in having multiple computers to operate in parallel to deliver higher image data rates to the print head assembly. In this implementation, each computer may have at least one PC card of control electronics 1060 connected to the PCI slot of the computer. In one example, four parallel computers, each containing two PCB cards of control electronics 1060, can offer 8 Gbps aggregate bandwidth, which can be enough to print four colors on each of the two sides of a newspaper in real time. The system 1000 may offer scalable transmission of high bandwidth, synchronous, just-in-time image data to the print head assembly in a number of configurations, including adding multiple FPGAs to the print assembly. Because the system 1000 can handle high bandwidths of image data, the system 1000 can provide just-in-time printing of high resolution images at high conveyor speeds, large-size images (e.g., wide and/or long images) at high conveyor speeds, and/or multi-color and grayscale images at high conveyor speeds.

Figure 11:
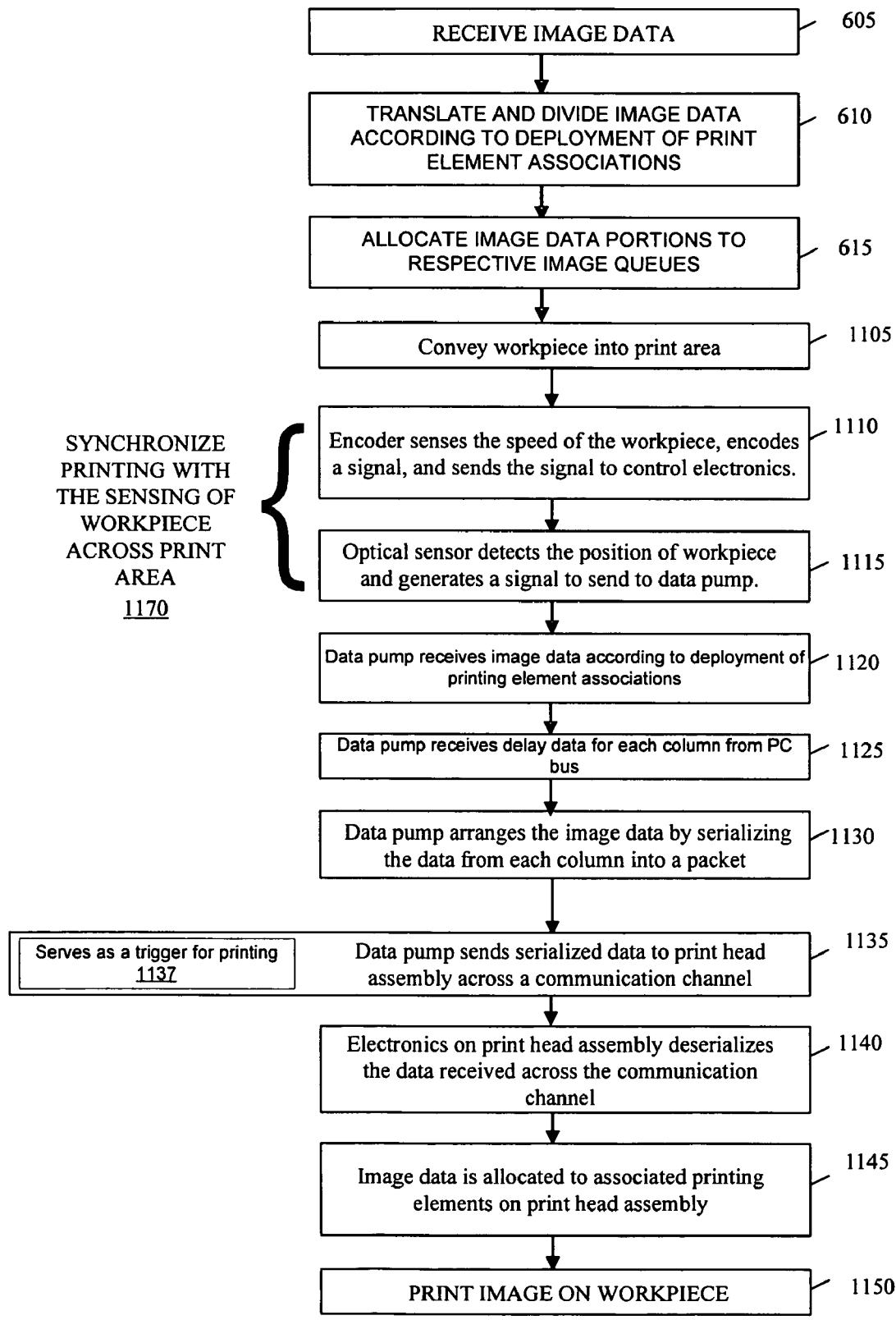
FIG. 11 is a flowchart of a process for synchronized printing on a workpiece.

FIG. 11 shows is a flowchart of a process for synchronized printing on a workpiece using the system 1000 of FIG. 10. The system 1000 receives the image data at 605. The image data may be received into a personal computer having a PC card with a data pump 1070 in the control electronics 1060 of the PC card.

The system 1000 can translate and divide the received image data according to the deployment of the associated print elements on the print assembly at 610. The image data can be translated before it is divided or can be divided before being translated. The system 1000 can allocate the image data portions that result from a division to different memory locations, such as individual print buffers at 615. A workpiece may be conveyed into the print area at 1105. A workpiece is not limited to be conveyed into the print area only at 1105, but may occur at other times, such as before 615 or 610.

The process of printing the received image on the workpiece is synchronized with the system 1000 detecting that the workpiece has entered the print area at 1170. The detection for this process utilizes the encoder 1007 to sense the speed of the workpiece across the conveyor at 1110. The encoder 1007 encodes a signal with information for the sensed speed and relays the encoded signal to control electronics 1060. The optical sensor 1055 detects the position of the workpiece and generates a signal to send to the data pump 1070 in the control electronics 1060 to facilitate synchronous printing on the workpiece.

The data pump 1070 fetches image data according to the deployment of printing element associations at 1120. The image data fetched by the data pump 1070 may be from the print image buffers 1065 of the PC. The data pump 1070 is not limited to fetching image data from the computer's different memory locations through the PCI slot at 1120, but rather may fetch image data at a time between 1125 and 1130.

At 1125, the data pump 1070 receives delay information for the associated columns 1011, 1012, 1013, 1014, 1015, 1016, 1017, and 1018. The delay information that is delivered to the data pump through the PCI slot may be delay values that are pre-programmed or fixed and are generated by an application software. The delay values may represent the physical distance between the associated columns 1011, 1012, 1013, 1014, 1015, 1016, 1017, and 1018 of print elements on the print head assembly. For example, if a print head assembly has four columns of associated columns with an inch of distance between each column, the first four delay values can represent an inch worth of scan line information. So, the physical design of the associated print element columns can determine the delay values. The data pump 1070 is not limited to receive delay information at 1125, but may receive delay information at a time prior to 1125.

The data pump arranges each column of data in time according to each column's delay value. The delay values are used by multiple state machines in the data pump to correctly arrange the image data into logical scan lines. The data pump serializes the data from each column into a data packet at 1130 and sends the serialized data to the print head assembly across a communication channel at 1135. In one implementation, the communication channel uses an optical fiber connection. The optical fiber may transmit image data at a rate of 1.25 Gb/s. In another implementation, the communication channel may utilize a copper cable connection.

Transmission of each scan line data packet at 1137 can serve as a trigger that causes the image data in the packet to be printed substantially immediately as the data arrives at the print head assembly. The electronics on the print head assembly receives the data packet sent over the communication channel and deserializes the data packet at 1140. The deserialized image data is allocated to the associated print elements on the print head assembly at 1145, and the image is printed on the workpiece at 1150. In one implementation, data received at the print head assembly is stored in one or more latches, and new (additional) data that is being received at the print head can serve as a trigger to print the latched data.

Figure 12:
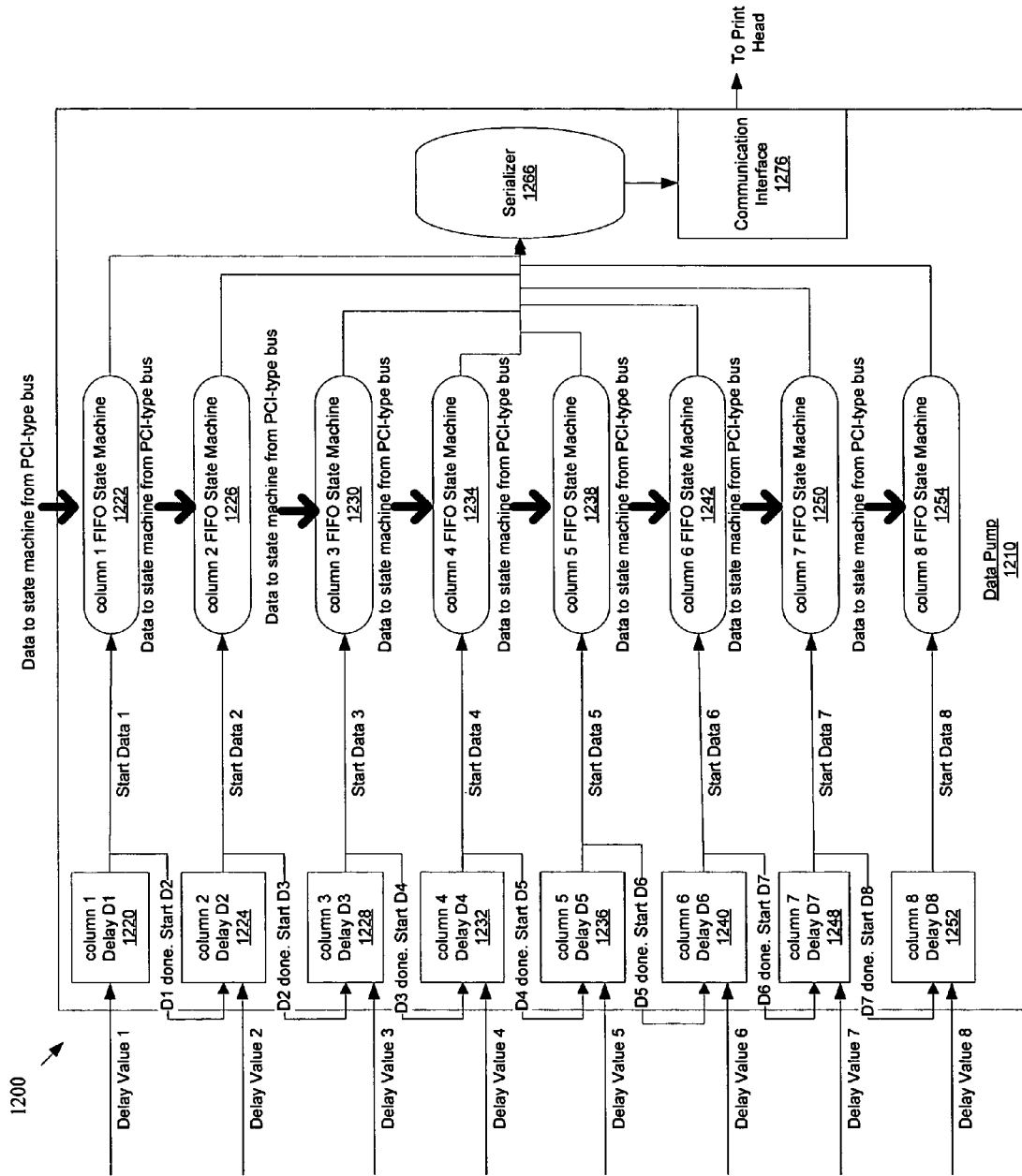
FIG. 12 schematically illustrates a data pump.

FIG. 12 schematically illustrates a data pump 1200. The data pump 1200 represents a hardware architecture for assembling the scan line data packets to send to the print head assembly. The data pump 1200 includes circuitry and components on a PC board that plugs into the PCI or PCI-X (Peripheral Component Interconnect Extended) or equivalent slot of the host computer. The data pump 1200 includes a parallel array of separate state machines 1222, 1226, 1230, 1234, 1238, 1242, 1250, 1254, one for each logical image queue. Each image queue can correspond to a separate physical column of associated print elements.

Each state machine can have a corresponding delay input that is configured to correctly arrange the image data into logical scan lines. Each state machine 1222, 1226, 1230, 1234, 1238, 1242, 1250, 1254 fetches image data from the host computer's PCI bus. The outputs of the read state machines are fed into a serializer 1266 that feeds the communication interface 1276 in the correct data order such that the appropriate image data is sent to the print head assembly at the correct timing. The serializer 1266 creates a packet of image data to travel to the print head assembly. Transmission of each scan line data packet can serve as a trigger that causes the image data in the packet to be printed substantially immediately as the data arrives at the print head assembly. In one implementation, the data received at the print head assembly is stored in a latch until new data arrives at the print head assembly. In this implementation, the new data arriving at the print head assembly can serve as a trigger to print the data that has been latched.

In the implementation shown in FIG. 12, an eight-column architecture for the data pump is used in which each of the physical columns of associated print elements function logically independently from the others, so that printing on the workpiece can be substantially continuous and without printing gaps. The schematic shows how the eight different delay values 1220, 1224, 1228, 1232, 1236, 1240, 1248, and 1252 serve as input delay values for the eight different state machines 1222, 1226, 1230, 1234, 1238, 1242, 1250, 1254 that read image data from the eight different buffers (1065 in FIG. 10) in the PC's memory space. The state machines are responsible for gathering image data from the PC out of a buffer 1065 that is specific to each state machine. The state machines gather image data that is temporally spaced in time, so that corresponding print columns 1011, 1012, 1013, 1014, 1015, 1016, 1017, 1018 each can print an image (or part of an image) on the workpiece at the correct time.

The delay values 1220, 1224, 1228, 1232, 1236, 1240, 1248, and 1252 for the input of each corresponding state machine 1222, 1226, 1230, 1234, 1238, 1242, 1250, 1254 are preprogrammed by application software. In this implementation, the delay values are fixed values that represent the physical distance between the columns of associated print elements on the print head assembly.

In one implementation, the state machine 1222 for column 1 fetches and processes the image data from the PCI bus after being delayed by delay value D1 1220. As the output from state machine 1222 for column 1 is sent into the serializer 1266, delay D1 is completed and state machine 1226 for column 2 fetches and processes the image data from the PCI bus after being delayed by delay value D2 1224. The process continues until all of the state machines send image data to the serializer 1266. When the scan line data packet from the data pump is sent to the print head assembly, the process begins again, and the state machine 1222 for column 1 fetches and processes new image data from the PCI bus after being delayed by delay value D1 1220. The state machines' fetching of data from the computer's PCI bus may be done ahead of time into a FIFO memory or an equivalent memory to minimize the effects of computer bus latency on the printing.

The data pump 1200 can facilitate just-in-time, synchronous transmission of image data from the host PC without the need for buffering or synchronizing logic at the print head assembly. Additional data pumps can be added to the host computer to scale to higher resolutions and/or to increase bandwidth requirements. Because each of the physical columns of associated print elements function logically independently from each other, bit manipulation does not have to be performed in the hardware of the print head assembly to achieve real-time printing of images with varying amounts of non-printed area between each image. The system can facilitate software bit manipulation, so bit manipulation can be performed at high data rates, and engineering and material costs can be reduced.

Figure 13:
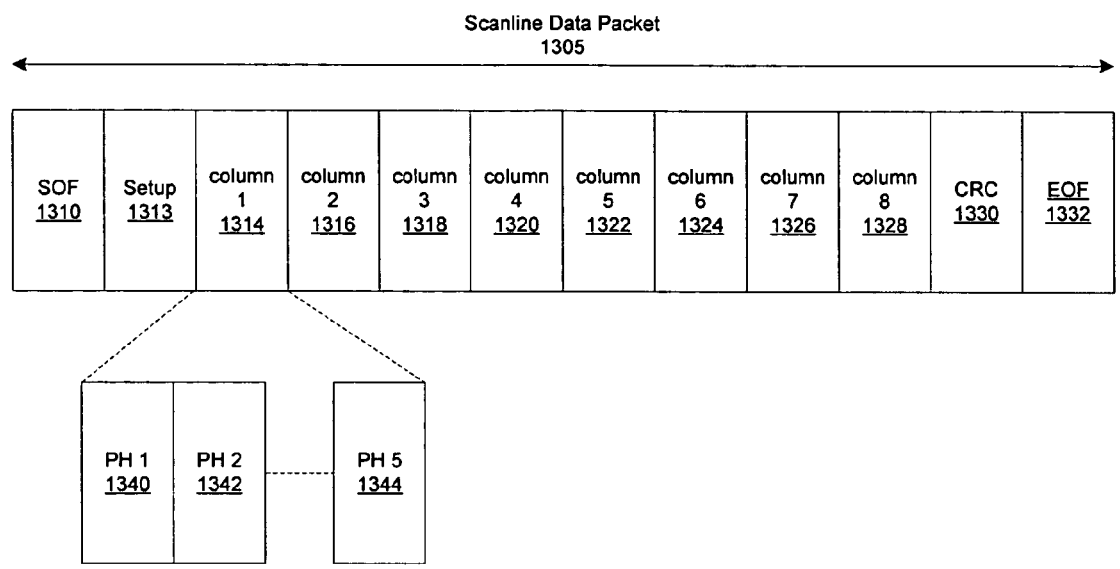
FIG. 13 schematically illustrates a packet of image data generated by the data pump.

FIG. 13 schematically illustrates a packet of image data generated by the data pump. The scan line data packet 1305 includes information to be used by the print head assembly. The packet 1305 has a start of frame (SOF) 1310 and setup data 1313 for the print head assembly. The setup data 1313 may specify an operating mode on the print head assembly (e.g., forward direction or reversion direction). The image data 1314-1328 for each column include a number of bytes that depends on the number of elements in the print column. For example, the image data for column 1 can have a number of bytes that depends on the number of print elements in column 1. PH 1 represents print element 1 for column 1, PH 2 represents print element 2 for column 1, and PH 5 represents print element 5 for column 1. CRC 1330 is the cyclic redundancy check, a 32-bit number that is generated from the data being sent so that the receiving electronics can verify that the entire data packet was sent correctly. The last word is the End of Frame 1332 to complete the data packet.

The packet 1305 is sent from the serializer 1266 to the communication interface 1276 on the data pump 1200 that converts the electronic signals to light signals to send to the optical fiber connection. On the other end of the optical fiber connection, the image data can be received by receiving hardware on the print head assembly. The receiving hardware can include an optical transceiver and logic to receive the light signal and convert the light signal into electronic signals. The receiving hardware also may include a deserializer to deserialize the data, and a decoder to decode the fiber transmission protocol. The image data can then be sent to the corresponding print element electronics to turn on or turn off the individual ink nozzles.

FIG. 14 shows exemplary specifications for the data pump. The data pump can have more than one type of hardware interface with the communication channel to the print assembly. One type of hardware interface can use PCI-X and optical fiber 1405 (for industrial or high-bandwidth applications) to send print data and control information to the print head assembly at data rates 1430 over 1 Gb/s. Another type of hardware interface is a PCI copper-cable interface 1410 having an image bandwidth capability 1430 of around 96 Mbit/s. The bus type 1415 for the optical fiber data pump is PCI-X and the bus type for the copper cable data pump is PCI.

The data pump can carry synchronous image data to the print head assembly, as well as lower-speed control data and tending or monitoring data. The control communication channels may be transparent to the high speed image data, and may be protocol-independent. The data pump's external interface 1420 for the optical fiber and the copper cable can differ, with the optical fiber having a duplex optical fiber, and the copper cable having a 50-conductor Flat Flexible Cable (FFC). The optical fiber and the copper cable versions can have the same hardware control inputs 1425.

Both the optical fiber version and the copper-cable version can operate the printing system in various printing modes 1445: triggered, free-running, forward scanning, and reverse scanning. Triggered mode can be used in printing images onto discrete, individual workpieces using a hardware trigger signal to initiate each image print. Free-running mode can provide printing of a continuous run of images, with programmable white spaces between each printed image. Forward and reverse scanning modes can provide printing in the forward or reverse directions. In one implementation, a single image may be printed for the forward or reverse scanning mode. In another implementation, multiple images may be printed while the system is in the forward or reverse scanning mode. The printing modes may also be mixed, so a reverse trigger mode or a reverse free-running mode may be utilized.

In the example configurations specified in FIG. 14, the data pump can service a print head assembly with one to eight logically independent columns of printing elements, with up to 5120 nozzles per column. This configuration can allow the use of large print head assemblies of 720 dpi (dots per inch) to be constructed with approximately 32 to 64 jet modules with 304 print elements each that can be fed by a single optical fiber. The size of the print head assembly may be determined as a function of the nozzle count multiplied by the maximum firing frequency of the nozzles, as well as the 1.25 Gb/s data rate. In one aspect, the frequency of the printing jets may operate in a range of around 40 kHz. In one implementation, several data pumps may be plugged into one PC motherboard and operated in parallel to provide higher bandwidths for larger print head assemblies. In another implementation, several PCs with data pumps may be operated in parallel to utilize large print head assemblies at low cost.

Each column of print elements can be independently provided with image data over the optical fiber or copper cable to allow continuous image printing, with little or no white space between images, and without a hardware bitmap-to-jetmap converter. Instead, the bitmap-to-jetmap conversion can be performed in real time by software running on the PC.

A number of implementations have been described. Nevertheless, it will be understood that various modifications may be made. For example, the sequences in FIG. 11 may be described in an order other than shown (e.g., the optical sensor may detect the position of the workpiece (block 1115) before the encoder senses the speed of the workpiece (block 1110)). The number of state machines and delay components may vary from the amount shown in FIG. 12. In another example, the exemplary data rates of the PC bus (1415) may vary from those shown in FIG. 14.

Accordingly, other implementations are within the scope of the following claims.

What is claimed is:

1. A method for synchronously printing an image on a workpiece, the method comprising:
   receiving image data at a location that is remote from a print head;
   arranging the received image data according to physical parameters of the print head to be used to print the image data on the workpiece;
   forming a first packet of image data;
   sending the first packet of image data to an electronic unit positioned on the print head;
   receiving subsequent image data at the location that is remote from the print head;
   arranging the received subsequent image data according to the physical parameters of the print head to be used to print the subsequent image data on the workpiece;
   forming a second packet of image data based on the arranged subsequent image data;
   sending the second packet of image data to the electronic unit positioned on the print head; and
   upon receiving the second packet of image data at the electronic unit on the print head,
      decoding the first packet of image data with the electronic unit, and
      printing the decoded first packet of image data on the workpiece, wherein the receipt of the second packet of image data by the electronic unit on the print head is used as a trigger to cause the decoded first packet of image data at the print head to be printed substantially immediately on the workpiece.

2. The method in accordance with claim 1, wherein the decoded first packet of image data being printed substantially immediately on the workpiece comprises printing the decoded first packet of image data substantially at an instant at which the second packet of image data arrives at the print head.

3. The method in accordance with claim 1, wherein the arranging of the received image data, and forming of the first packet of image data are order-independent.

4. The method in accordance with claim 1, wherein for each packet of image data, two or more of the receiving, arranging, forming, and sending, are to be performed at least partially in parallel.

5. The method in accordance with claim 1, further comprising translating the first packet of image data into a format understandable by a printer.

6. The method in accordance with claim 1, wherein the first packet of image data is formed by a data pump.

7. The method in accordance with claim 1, wherein the first or second packet of image data is received from a Peripheral Component Interconnect-type bus of a host computer.

8. The method of claim 1, wherein the electronic unit comprises a detachable electronic unit.

9. The method of claim 1, wherein the first packet of image data is sent to the electronic unit on the print head at a data rate of at least 1 Gbps.

10. The method of claim 9, wherein the first packet of image data is sent through an optical communication path.

11. The method of claim 1, wherein the second packet of image data is sent to the electronic unit on the print head at a data rate of at least 1 Gbps.

12. The method of claim 11, wherein the second packet of image data is sent through an optical communication path.

13. The method of claim 1, wherein the first packet of image data is sent to the electronic unit on the print head at a data rate of at least 8 Gbps.

14. The method of claim 13, wherein the first packet of image data is sent through an optical communication path.

15. The method of claim 1, wherein the second packet of image data is sent to the electronic unit on the print head at a data rate of at least 8 Gbps.

16. The method of claim 15, wherein the second packet of image data is sent through an optical communication path.

* * * * *

UNITED STATES PATENT AND TRADEMARK OFFICE
CERTIFICATE OF CORRECTION

PATENT NO. : 7,722,147 B2 Page 1 of 1
APPLICATION NO. : 10/966205
DATED : May 25, 2010
INVENTOR(S) : Deane A. Gardner It is certified that error appears in the above-identified patent and that said Letters Patent is hereby corrected as shown below:

Column 1, Line 6:
delete "The" and insert --This--, therefor.

Column 22, Line 15, Claim 4:
delete "sending," and insert --sending--, therefor.

Signed and Sealed this

Tenth Day of August, 2010

David J. Kappos
*Director of the United States Patent and Trademark Office*